(12) United States Patent
Schwartz

(10) Patent No.: US 10,779,110 B2
(45) Date of Patent: Sep. 15, 2020

(54) METHODS AND SYSTEMS FOR MOBILE ENTRY USING AN ACCESS CONTROL DEVICE POWER MANAGEMENT SYSTEM

(71) Applicant: Hyatt Corporation, Chicago, IL (US)

(72) Inventor: Joe Schwartz, Chicago, IL (US)

(73) Assignee: HYATT CORPORATION, Chicago, IL (US)

( * ) Notice: Subject to any disclaimer, the term of this patent is extended or adjusted under 35 U.S.C. 154(b) by 0 days.

(21) Appl. No.: 16/204,728

(22) Filed: Nov. 29, 2018

(65) Prior Publication Data

US 2019/0110158 A1 Apr. 11, 2019

Related U.S. Application Data

(63) Continuation-in-part of application No. 15/855,549, filed on Dec. 27, 2017, which is a continuation of application No. 15/266,577, filed on Sep. 15, 2016, now Pat. No. 9,888,346.

(60) Provisional application No. 62/220,499, filed on Sep. 18, 2015, provisional application No. 62/612,913, filed on Jan. 19, 2018.

(51) Int. Cl.
*H04W 4/021* (2018.01)
*H04W 4/02* (2018.01)
*H04W 12/08* (2009.01)
*G07C 9/00* (2020.01)

(52) U.S. Cl.
CPC ........ *H04W 4/021* (2013.01); *G07C 9/00309* (2013.01); *H04W 4/025* (2013.01); *H04W 12/08* (2013.01)

(58) Field of Classification Search
CPC ..... H04W 4/021; H04W 4/025; H04W 12/08; G07C 9/00309
See application file for complete search history.

(56) References Cited

U.S. PATENT DOCUMENTS

| | | | | |
|---|---|---|---|---|
| 9,842,446 | B2 * | 12/2017 | Vecchiotti | G07C 9/00103 |
| 10,015,653 | B2 * | 7/2018 | Lang | H04W 4/043 |
| 2013/0059598 | A1 * | 3/2013 | Miyagi | H04W 4/023 |
| | | | | 455/456.1 |
| 2015/0199863 | A1 * | 7/2015 | Scoggins | G07C 9/00904 |
| | | | | 340/5.25 |
| 2015/0348049 | A1 * | 12/2015 | Todasco | G06Q 10/02 |
| | | | | 705/5 |
| 2016/0239001 | A1 * | 8/2016 | Chin | G05B 15/02 |
| 2017/0295545 | A1 * | 10/2017 | Zacchio | H04W 52/0229 |

* cited by examiner

*Primary Examiner* — Wayne H Cai
(74) *Attorney, Agent, or Firm* — BakerHostetler

(57) ABSTRACT

Methods and systems for mobile entry may include determining that a user of a mobile device is eligible for a mobile entry program associated with a hospitality service. There may be a reservation for the hospitality service. A mobile entry program key associated with the reservation may be stored to the mobile device. An access device associated with the hospitality service may be switched to an operating mode in which the access device may receive the mobile entry program key from the mobile device.

20 Claims, 20 Drawing Sheets

METHODS AND SYSTEMS FOR MOBILE ENTRY USING AN ACCESS CONTROL DEVICE POWER MANAGEMENT SYSTEM

CROSS REFERENCE TO RELATED APPLICATIONS

This application is a continuation-in-part of U.S. patent application Ser. No. 15/855,549, filed Dec. 27, 2017, which is a continuation of U.S. patent application Ser. No. 15/266,577, filed Sep. 15, 2016, which claims the benefit of U.S. Provisional Patent Application No. 62/220,499, filed Sep. 18, 2015, and U.S. Provisional Application No. 62/612,913 filed Jan. 19, 2018, each of which are hereby incorporated by reference in their entirety.

BACKGROUND

Places of hospitality such as hotels, resorts, and parks provide guests with a number of services. In order to control access to certain services, these places may use locks and other types of access devices to secure the services. For example, a room that is reserved for a guest may be secured using an electronic lock, and only the guest that is authorized access to the room may have a key that opens the lock. Other examples of secured or controlled areas may include a gated parking structure or a VIP club.

Typically, guests with authorization to access a controlled area of a place of hospitality are required to obtain an access key, such as a magnetic card, for unlocking an access device. For different controlled areas such as a room and a fitness center, guests may also need to obtain more than one access key. With multiple keys, it may be difficult for guests to locate the right key for unlocking a particular access device. Guests may also lose track of keys and have to obtain new keys to access a controlled area.

Many access keys also need to be placed in close proximity or within access devices in order to unlock the access point. For example, a magnetic stripe card key may need to be swiped by a guest through a card reader on an access point in order to unlock the access point. For guests carrying loads, having to set down the load in order to find the right access key to unlock an access point may be inconvenient and time-consuming. Many guests may also carry an access key in a purse or briefcase and have to spend time locating the access key in their purse or briefcase in order to unlock an access point.

Guests may also encounter delays and congestion in obtaining their access keys. Guests typically pick up their access keys from a front desk of a hospitality establishment. Oftentimes, however, the lines before front desks are long due to the number of guests staying at these establishments. Guests that misplace keys may also have to return to the front desk multiple times in order to obtain new access keys. Access keys such as magnetic cards may also lose their data when placed near a mobile device such as a cell phone, which may necessitate another visit to the front desk.

Moreover, access points at places of hospitality are typically set to operate in a static sleep/wake power cycle. Because most access points are powered by batteries, the sleep/wake cycle of the access point is designed to maximize the period of time that a set of batteries would last. Specifically, the ACP may be set to operate in a sleep mode for static time increments and to wake periodically to check for control messages from an external source (e.g., an upstream control point or a lock server). In its sleep mode, the access point cuts power to any unneeded components, thereby conserving power. But the access point in the sleep mode may not respond to signal from an external source. As a result, with a static sleep/wake schedule, if an unlock message is sent to a specific access point when it is in sleep mode, then the access point may not respond to the unlock message and provide access to a controlled area until it cycles into its wake mode. This may cause guests to wait for a longer period of time (i.e., wait until the access point is in wake mode) in order to gain entry into the controlled area. While a solution to this problem may be to always operate the access points in a wake mode, such a solution reduces energy efficiency and may pose an inconvenience to guests and hospitality staff if the access points require constant battery changes.

SUMMARY

Methods and systems for mobile entry may include determining that a user of a mobile device is eligible for a mobile entry program. The user may have a reservation for a hospitality service. A mobile entry program key associated with the reservation may be generated. The mobile entry program key may be stored to the mobile device. An access device may be located at an access point to the hospitality service. The access device may be switched to an operating mode in which the access device may receive the mobile entry program key, such as from the mobile device.

BRIEF DESCRIPTION OF THE DRAWINGS

Aspects of the herein described method sand systems for mobile entry are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout. In the drawings.

DETAILED DESCRIPTION

Figure 1:
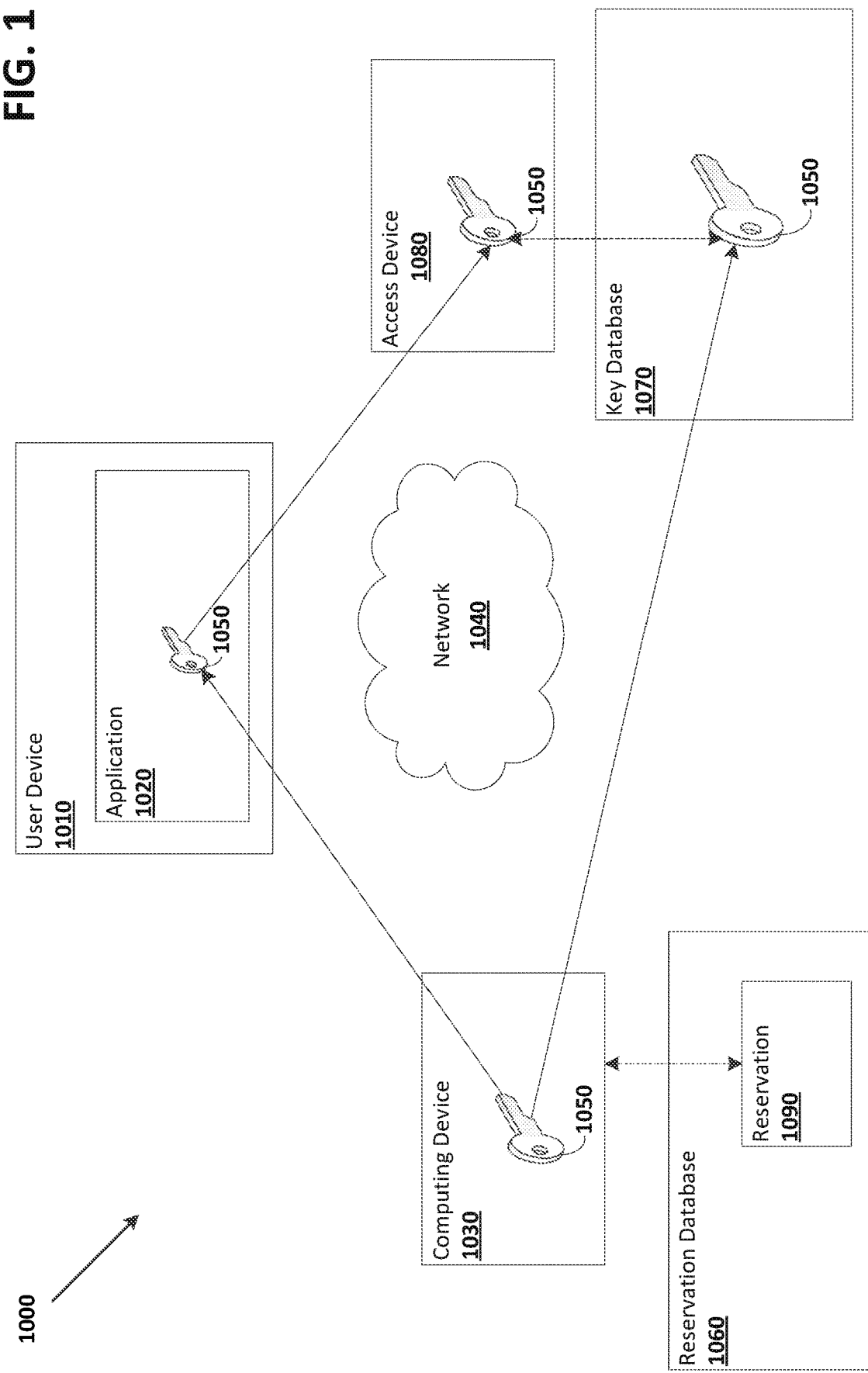
FIG. 1 is a diagram illustrating an example mobile entry system.

Places of hospitality such as hotels, resorts, and parks provide guests with a number of hospitality services. A hospitality service may include an area at a place of hospitality, such as a guest room, a fitness facility, a pool area, a spa, a parking area, an entertainment center, a restaurant, a bar, a business center, or a conference center, for example. The hospitality service may include an amenity such as an internet service, a communication service (such as use of a pay phone or a fax machine), a parking privilege, a spa treatment, a class, or an event pass, for example. The hospitality service may be a physical commodity such as food, beverage, or merchandise, for example.

A place of hospitality, such as a hotel or a resort, may limit or control access to the hospitality service to an authorized guest. The authorized guest may be a guest with a reservation. The reservation may authorize the guest to access one or more hospitality services. The authorized guest may be a guest who has provided payment for the hospitality service. The authorized guest may be a guest who is a member of a loyalty program. The authorized guest may be a guest for whom it has been determined access should be granted to the hospitality service.

An authorized guest may be required to obtain a physical access key, such as a magnetic card or a radio-frequency identification (RFID) card, for unlocking an access device to access a hospitality service. For different hospitality services or controlled areas, such as a room and a fitness center, the guest may also need to obtain more than one access key. With multiple keys, it may be difficult for the guest to locate the right key for unlocking a particular access point. The guest may also lose track of keys and have to obtain new keys to access a hospitality service or controlled area.

An access key may need to be placed in close proximity or within an access point in order to unlock the access point. For example, a magnetic stripe card key may need to be swiped by a guest through a card reader on an access point in order to unlock the access point. For a guest carrying a load, having to set down the load in order to find the right access key to unlock an access point may be inconvenient and time-consuming. A guest carrying an access key in a purse or briefcase may spend time locating the access key in the purse or briefcase in order to unlock an access point.

A guest may encounter a delay or congestion in obtaining an access key. The guest may retrieve the access key from a front desk of a place of hospitality. There may be a line at the front desk. If the guest misplaces the access key, the guest may have to return to the front desk to obtain a replacement access key. An access key, such as a magnetic card, may lose data when placed near a mobile device, such as a cell phone. The guest may have to return to the front desk to replace the data on the access key.

Moreover, an access point at a place of hospitality may be set to operate in a static sleep/wake power cycle. The access point may be powered by batteries. The sleep/wake cycle of the access point may be configured to maximize the period of time that a set of batteries lasts. Specifically, the access point may be set to operate in a sleep mode for static time increments and to wake periodically to check for control messages from an external source (e.g., an upstream control point or a lock server). In its sleep mode, the access point cuts power to any unneeded components, thereby conserving power. However, the access point in the sleep mode may not respond to signal from an external source. As a result, with a static sleep/wake schedule, if an unlock message is sent to a specific access point when it is in sleep mode, the access point may not respond to the unlock message. The access point may not provide access to a hospitality service or controlled area until it cycles into its wake mode. Consequently, a guest may wait for a period of time (i.e., wait until the access point is in wake mode) in order to gain access to the hospitality service or controlled area. The management of access to the hospitality service may be streamlined by a mobile entry method of system. The mobile entry method or system may include assigning an electronic key to the authorized guest. The electronic key may be transmitted to a user device, such as a mobile device, associated with the authorized guest. The electronic key may be stored on the user device. The user device may transmit the electronic key to an access device associated with the hospitality service. The access device may be configured to control access to the hospitality service. The access device may receive the electronic key from the user device. The access device may determine that the electronic key is associated with an authorized guest. The access device may have access to a database of electronic keys assigned to authorized guests. The access device may query the database to determine whether the received electronic key is an electronic key associated with an authorized guest. Alternatively or in addition, the access device may be in communication with another device that determines that the electronic key is associated with an authorized guest. Alternatively or in addition, an electronic key may have been stored on the access device. The access device may determine that the electronic key is associated with an authorized guest by determining that the electronic key matches the key stored on the access device.

Responsive to determining that the received electronic key is associated with an authorized guest, the access device may allow access to the hospitality service. For example, if the hospitality service includes a controlled area, the access device may allow entrance to the controlled area. If the hospitality service is an amenity, the guest may use the amenity. If the hospitality service is a physical commodity, the physical commodity may be given to the guest.

FIG. 1 shows an example mobile entry system 100. The system 100 may include a user device 101. The user device 101 may include a memory and one or more processors. The memory may be a computer-readable medium, such as a memory device, a magnetic medium, an optical medium, firmware, or another type of medium. The memory may store computer-readable instructions. The computer-readable instructions, when executed by the one or more processors, may cause the user device 101 to execute a process, such as any of the mobile entry processes described in the present disclosure. The user device 101 may be a mobile device, such as a mobile telephone, a laptop computer, a tablet device, a portable digital assistant, a portable game console, or an Internet of Things (IoT) device.

An application 102 may be installed on the user device 101. The application 102 may include software configured to run on a mobile device. The application 102 may be configured to support iOS and Android operating systems, for example. The application 102 may be associated with a hospitality service. The application 102 may include a software development kit (SDK) associated with mobile entry. The application 102 may be stored on the memory of the user device 101. The application 102 may store settings associated with mobile entry. A user may log-in, via the application 102 on the user device 101, to an account associated with the hospitality service. After logging-in to the account, the user may select, via the application 102 on the user device 101, an option to enable a mobile entry setting.

A computing device 103 may be configured to determine that the mobile entry setting was enabled on the user device 101. The computing device 103 may include a memory and one or more processors. The memory may be a computer-readable medium, such as a memory device, a magnetic medium, an optical medium, firmware, or another type of medium. The memory may store computer-readable instructions. The computer-readable instructions, when executed by the one or more processors, may cause the computing device 103 to execute a process, such as any of the mobile entry processes described in the present disclosure. The computing device 103 may be a server. The computing device 103 may be associated with the hospitality service. The computing device 103 may be located at a place of hospitality or the computing device 103 may be located external to the place of hospitality.

The computing device 103 may be in communication with the user device 101, such as via a network 104. The network 104 may be a local area network, a wide area network, an intranet, an extranet, the Internet, or another type of network. The computing device 103 or the user device 101 may be in communication with the network 104 via a wired or wireless connection. The computing device 103 may be configured to receive, via the network 104, an indication that the mobile entry setting was enabled on the user device 101.

Responsive to the enablement of the mobile entry setting on the user device 101, the computing device 103 may be configured to determine that the user device 101 is associated with an authorized guest. The computing device 103 may be configured to determine that the user device 101 is associated with an authorized guest by determining that a reservation has been made for the hospitality service. The computing device 103 may be configured to determine that the reservation is associated with the user device 101, for example. The computing device 103 may be configured to determine that the reservation is associated with the account and that the user device 101 is associated with the account.

The computing device 103 may be configured to determine that the reservation is eligible for mobile entry. The reservation may be eligible for mobile entry based on a status of the reservation, such as a ready status or a checked-in status. The reservation may be eligible for mobile entry based on a capability or setting of the user device 101. As an illustrative example, the reservation may be eligible for mobile entry based on a security setting of the user device 101. The reservation may be eligible for mobile entry based on whether the hospitality service associated with the reservation is eligible for mobile entry. For example, the hospitality service may be eligible for mobile entry if an access device 108 associated with the hospitality service is configured for mobile entry.

The computing device 103 may be configured to determine that the user device 101 is associated with an authorized user by querying a reservation database 106. The reservation database 106 may be stored on the memory of the computing device 103. The reservation database 106 may be stored on one or more other devices, such as on a cloud system. The reservation database 106 may include a record of reservations, user devices, accounts, or users, for example. The computing device 103 may be configured to determine that the reservation database 106 include an indication of the user device 101, the account, or the user of the user device 101, for example. The computing device 103 may be configured to determine that the reservation database 106 indicates that a reservation 109 associated with the user device 101, the account, or the user has been made.

The computing device 103 may be configured to determine if an electronic key 105 has been generated for the user device 101. The electronic key 105 may be a series of alphanumeric characters, for example. The electronic key 105 may be configured to enable access to the hospitality service. The electronic key 105 may be configured to enable access to the hospitality service via the access device 108 associated with the hospitality service. The electronic key 105 may be configured to enable access to a plurality of hospitality services. As an illustrative example, the electronic key 105 may be configured to enable access to one or more hotel rooms. As another illustrative example, the electronic key 105 may be configured to enable access to a fitness center, enable access an Internet service, and enable redemption of a meal. The electronic key 105 may be associated with a vendor or a manufacturer of the access device 108.

Based on a determination that an electronic key 105 has been generated for the user device 101, the computing device 103 may be configured to determine that parameters associated with the electronic key 105 match parameters associated with the reservation. For example, the computing device 103 may be configured to determine that a location of a hospitality service associated with the electronic key 105 matches a location associated with the reservation. Based on a determination that the parameters associated with the electronic key 105 do not match the parameters associated with the reservation, the computing device 103 may be configured to modify the at least one of the parameters associated with the electronic key 105 or the parameters associated with the reservation. For example, if the electronic key 105 is associated with a timeframe that is longer than a timeframe of the reservation, the timeframe of the reservation may be extended to that associated with the electronic key 105. Based on a determination that the parameters of the electronic key 105 do not match the parameters associated with the reservation, the computing device 103 may be configured to delete the electronic key 105. Based on a determination that the parameters associated with the electronic key 105 do not match the parameters associated with the reservation, the computing device 103 may be configured to generate a new electronic key 105 for the user device 101.

Based on a determination that the user device 101 is not associated with an authorized guest and that an electronic key 105 has been generated for the user device 101, the computing device 103 may be configured to the electronic key 105 associated with the user device 101.

Based on a determination that the user device 101 is associated with an authorized guest, the computing device 103 may be configured to generate the electronic key 105 for the user device 101. Based on a determination that an electronic key has not been generated for the reservation or the user device 101, the computing device 103 may be configured to generate the electronic key 105 for the user device 101.

The computing device 103 may be configured to store the electronic key 105 to a key database 107. The key database 107 may be associated with the hospitality service. The key database 107 may be stored on the computing device 103. The key database 107 may be stored on one or more other devices, such as on a cloud system. The key database 107 may include a record of electronic keys, reservations, user devices, accounts, or users, for example. The key database 107 may be the reservation database 106. The key database 107 and the reservation database 106 may be stored on the same device or devices.

The computing device 103 may be configured to transmit the electronic key 105 to the user device 101, such as via the network 104. The computing device 1030 may be configured to transmit the electronic key 105 to the access device 108, such as via the network 104. The computing device 103 may be configured to transmit the electronic key 105 to a plurality of devices. For example, the computing device 103 may be configured to transmit the electronic key 105 to the user device 101 and to a device associated with another guest who is to access the hospitality service. The electronic key 105 may be stored on the memory of the user device 101. The electronic key 105 may be stored on a plurality of devices, such as on the user device 101 and on the other device associated with the other guest. The electronic key 105 may be stored on the application 102 on the user device 101.

The user device 101 may be configured to transmit the electronic key 105 to the access device 108. The access device 108 may be configured to control access to the hospitality service. The access device 108 may include a memory and one or more processors. The memory may be a computer-readable medium, such as a magnetic medium, an optical medium, or another type of medium. The memory may store computer-readable instructions. The computer-readable instructions, when executed by the one or more processors, may cause the access device 108 to execute a process, such as any of the mobile entry processes described in the present disclosure.

The access device 108 may include a sensor. The sensor may be an optical sensor, a motion sensor, a biometric sensor, a thermal sensor, or another sensor. The access device 108 may be configured to read data stored on another device, such as using the sensor. For example, the access device 108 may include a barcode scanner, a chip reader, a Wiegand interface, a radio frequency identification (RFID) tag reader, or a magnetic strip reader. The access device 108 may be a payment processing device. The access device 108 may be an Internet of Things (IoT) device, such as a consumer device, a home appliance, a transportation device, a multimedia device, an automation device, a security device, a premises management device, or a retail device. The access device 108 may be located at a place of hospitality or the access device 108 may be located external to the place of hospitality. For example, the access device 108 may be located at an access point of the hospitality service, such as at an entryway to the hospitality service. For example, the access device 108 may include or be a component of a turnstile, a door, or a gate. The access device 108 may include a lock. The lock may be a mechanical lock, such as a mortise lock, a cylindrical lock, a bored lock, or a tubular lock. The lock may be an electromechanical lock, such as a lock comprising an electronic keypad or a lock configured to communicate via a wired communication protocol or a wireless communication protocol.

The access device 108 may be configured to operate in a sleep mode and a wake mode. The access device 108 may be configured to consume less power in the sleep mode than in the wake mode. For example, the access device 108 may be configured to be in communication with a network, such as the network 104, in the wake mode and may be configured to not be in communication with the network in the sleep mode. The access device 108 may be configured to operate in the sleep mode and the wake mode based on cycles. The cycles may be temporal cycles. The access device 108 may be configured to operate in the sleep mode until the access device 108 receives a signal. The signal may include an indication to switch to the wake mode. The signal may be from another device, such an access device controller, the computing device 103, or the user device 101. The other device may transmit, to the access device 108, the signal based on a location of the user device 101. For example, the other device may transmit the signal based on a determination that the user device 101 is within a predetermined distance relative to the access device 1080. The other device may transmit the signal based on a determination that the user device 101 is within a distance relative to the access device 108 in which the user device 101 and the access device 108 are able to communicate. The access device 108 may be configured to receive the electronic key 105 in the wake mode.

The user device 101 may be configured to transmit the electronic key 105 to the access device 108 wirelessly. For example, the user device 101 may be configured transmit the electronic key 105 to the access via the network 104. As another example, the user device 101 may be configured to transmit the electronic key 105 to the access device 108 via a personal area network (PAN), such as a Bluetooth network or a ZigBee network. As another example, the user device 101 may be configured to transmit the electronic key 105 to the access device 108 via a local area network (LAN), a wide area network (WAN), a home area network (HAN), or another network. As another example, the user device 101 may be configured to transmit the electronic key 105 to the access device 108 via a radio frequency. The user device 101 may be configured to establish communication with the access device 108. For example, the user device 101 may be configured to initiate a secure communication session with the access device 108. The user device 101 may be configured to initiate the secure communication session by performing a handshake protocol process with the access device 108.

The user device 101 may be configured to transmit the electronic key 105 to the access device 108 based on a location of the user device 101. For example, the user device 101 may be configured to transmit the electronic key 105 to the access device 108 when the user device 101 is within a predetermined distance from the access device 108. As another example, the user device 101 may be configured to transmit the electronic key 105 to the access device 108 when the user device 101 is at the place of hospitality. Additionally or alternatively, the user device 101 may be configured to transmit the electronic key 105 to the access device 108 responsive to receiving an input, such as via the application 102. The access device 108 may be configured to receive the electronic key 105 from the user device 101.

The user device 101 may be configured to output an indication of the electronic key 105. For example, the user device 101 may be configured to display an indication of the electronic key 105. The indication of the electronic key 105 may be a barcode, a radio frequency identification (RFID) tag, or another computer-readable indication of the electronic key 105. If the user device 101 is configured to output the indication of the electronic key 105, the access device 108 may be configured to read the electronic key 105 on the user device 101.

The access device 108 may be configured to determine that the electronic key 105 is associated with an authorized guest. The access device 108 may be configured to determine that the electronic key 105 is associated with an authorized guest by querying the key database 107. The access device 108 may be configured to determine that the key database 107 includes an indication of the electronic key 105. The access device 108 may be configured to determine that the key database 107 includes an indication that the electronic key 105 is associated with an authorized guest.

The access device 108 may be configured to determine that the electronic key 105 is associated with an authorized guest by communicating with another device, such as with the computing device 103. For example, the access device 108 may be configured to transmit, to the other device, an indication of the electronic key 105. The access device 108 may be configured to receive, in response, an indication that the electronic key 105 is associated with an authorized guest. The access device 108 may receive, in response, an indication to allow access to the hospitality service.

The access device 108 may be configured to determine that the electronic key 105 is associated with an authorized guest by determining that the electronic key 105 matches a key stored on the memory of the access device 108. The key stored on the memory of the access device 108 may be a key received from another device, such as from the computing device 103.

Responsive to determining that the electronic key 105 is associated with an authorized guest, the access device 108 may be configured to allow access to the hospitality service. For example, if the hospitality service includes a controlled area, the access device 108 may be configured to allow entrance to the controlled area. As an illustrative example, if the access device 108 is a gate, the gate may open. As another illustrative example, if the access device 108 is a lock, the lock may unlock.

After the hospitality service has been accessed, the user device 101 may be configured to transmit the electronic key 105 to the access device 108 to terminate access to the hospitality service. In response to receiving the electronic key 105, the access device 108 may be configured to terminate access to the hospitality service. As an illustrative example, if the hospitality service is a hotel room and the access device 108 is a lock on a door of the hotel room, the user device 101 may transmit the electronic key 105 to lock the door. In response to receiving the electronic key 105, the access device 108 may lock the door.

Figure 2:
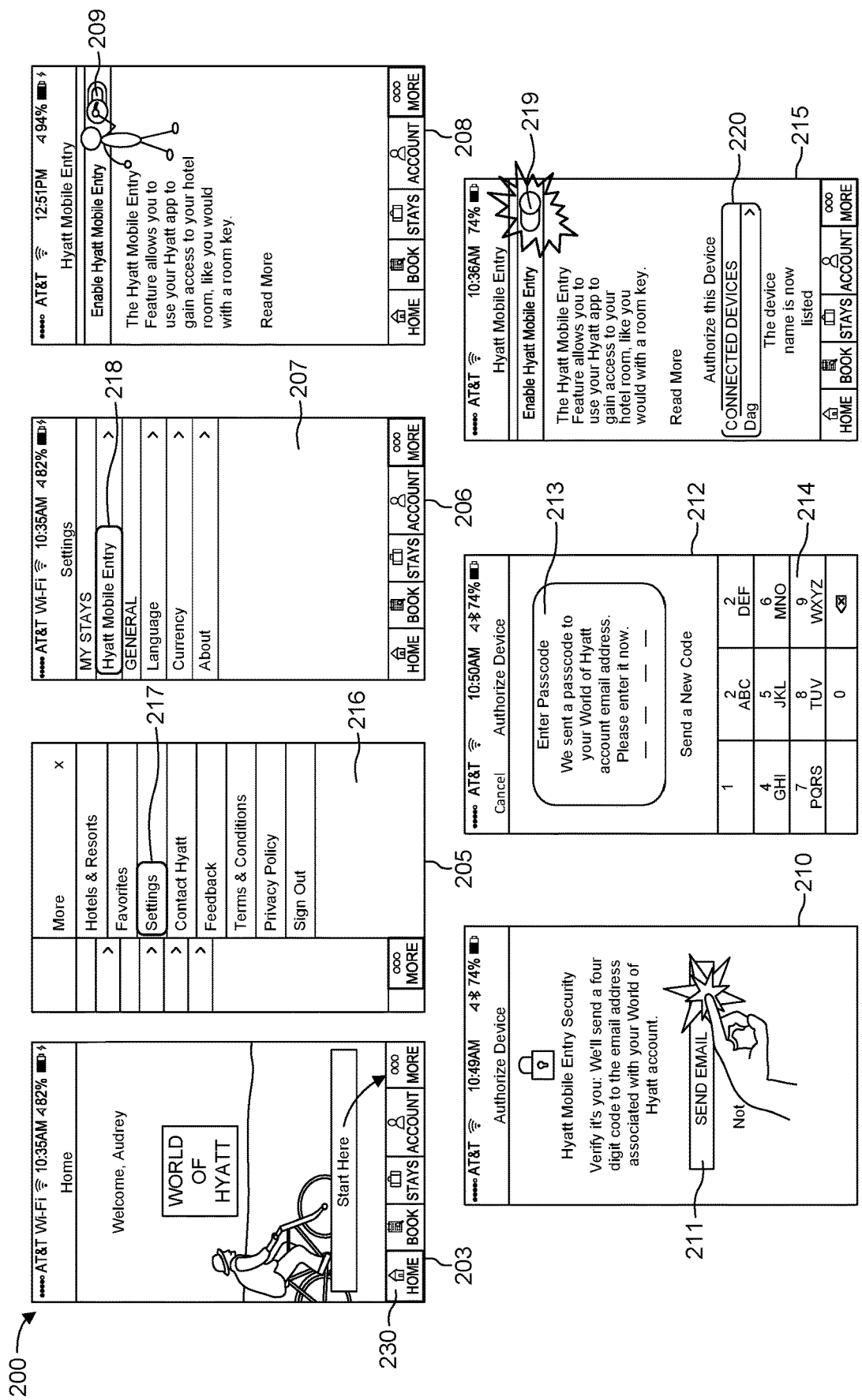
FIG. 2 illustrates an example hospitality service application.

FIG. 2 shows an example hospitality service application 200. The hospitality service application 200 may be on a user device (e.g., user device 101 in FIG. 1). The hospitality service application 200 may include a graphic user interface. The hospitality service application 200 may display an opening page 203 of the hospitality service application 200. The opening page 203 may be displayed after a log-in process is performed. The log-in process may include logging-into an account. The opening page 203 may display a tab 230 comprising a plurality of selectable icons. The selectable icons may be selected by a user input via the user device. The user input may be, for example, a tap on a touchscreen of the user device over one of selectable icons or a push on a button of the user device.

Responsive to a selection of one of the selectable icons, a menu page 205 may be displayed. The menu page 205 may display a list of selectable titles 216. One of the selectable titles may display a settings title 217.

Responsive to a selection of the settings title 217, a settings page 206 may be displayed. The settings page 206 may have a list 207 of indications of settings. One of the indications of settings may be an indication of a mobile entry setting 218.

Responsive to a selection of the indication of the mobile entry setting 218, a mobile entry page 208 may be displayed. The mobile entry page 208 may display an icon 209 configured to enable a user to enable or disable a mobile entry setting. For example, the icon 209 may be a slidable icon. A sliding of the icon 209 in one direction may indicate a selection to disable the mobile entry setting and a sliding of the icon 209 in another direction may indicate a selection to enable the mobile entry setting.

Responsive to an enablement of the mobile entry setting, a device authorization page 210 may be displayed. The device authorization page 210 may display a selectable send email icon 211. Responsive to a selection of the send email icon 211, a communication may be sent to an email account associated with the account. The communication may include a code, such as a series of alphanumeric characters. As an example, the code may have four digits.

After the communication is sent to the email, another device authorization page 212 may be displayed. The device authorization page 212 may have a code input field 213. The code input field 213 may be configured to enable a user to enter the code that was sent in the communication. The device authorization page 212 may display a graphic user interface keyboard 214. The graphic user interface keyboard 214 may have graphic buttons associated with alphanumeric characters. Responsive to a selection of one of the graphic buttons, the code input 213 may be filled with an associated alphanumeric character.

If the code entered on the device authorization page 212 matches the code sent in the communication, the mobile entry setting may be activated on the user device. Responsive to the codes matching, the user device may receive an electronic key. Responsive to the codes matching, a mobile entry page 215 may be displayed. The mobile entry page 215 may display an icon 219 configured to enable the user to enable or disable the mobile entry setting. For example, the icon 219 may be a slidable icon. A sliding of the icon 219 in one direction may indicate a selection to disable the mobile entry setting and a sliding of the icon 219 in another direction may indicate a selection to enable the mobile entry setting. The mobile entry page 215 may display an indication of one or more devices 220. For example, the indication 220 may be an indication of an access device (e.g., access device 108 in FIG. 1). The mobile entry page 215 may display a selectable option to authorize the indicated device. In response to a selection of the selectable option, communication between the user device and the indicated device may be established. For example, a secure communication session between the user device and the indicated device may be initiated. The secure communication session may be initiated via the application. In response to the selection of the selectable option, the electronic key may be transmitted to the indicated device. For example, the user device may transmit the electronic key to the indicated device via the secure communication session.

Figure 3:
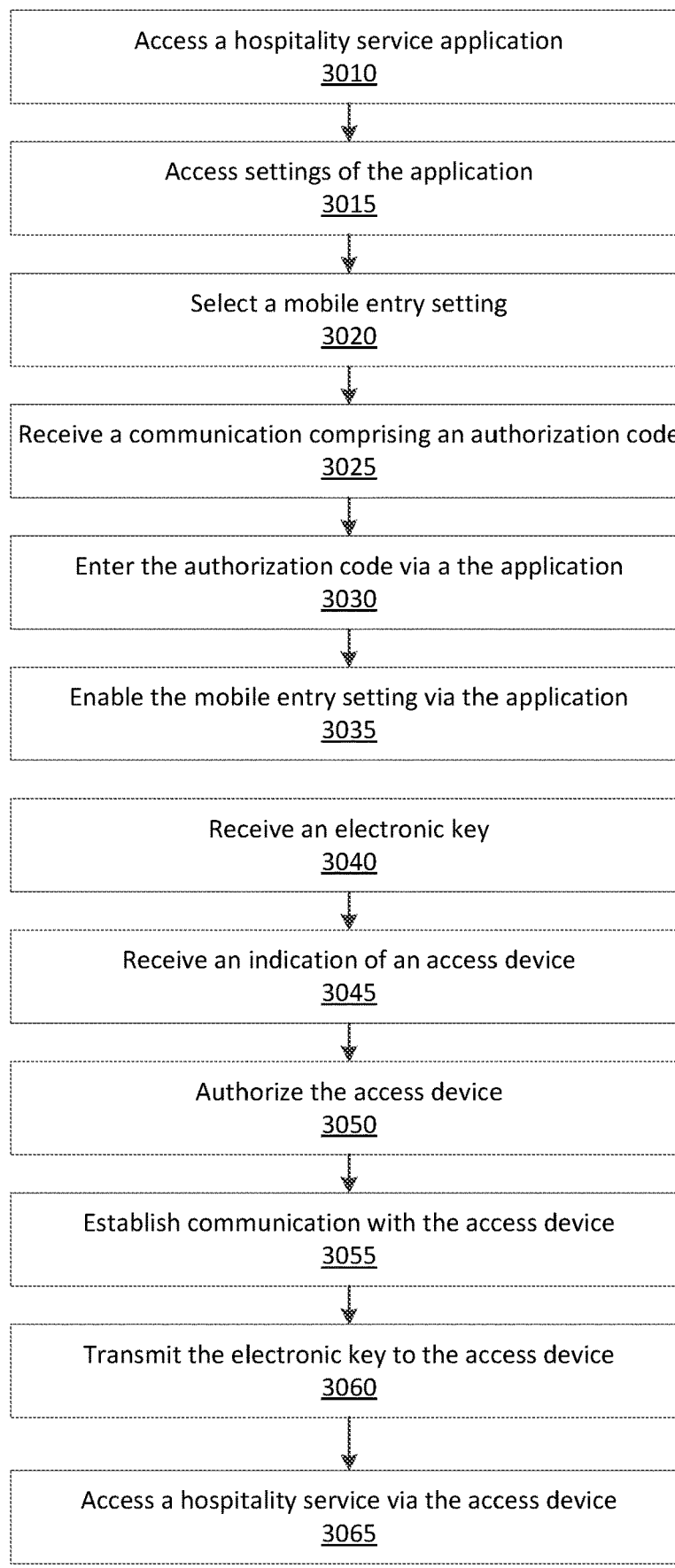
FIG. 3 illustrates a flow chart showing an example process for mobile entry.

FIG. 3 shows an example mobile entry method. At step 310, a hospitality service application may be accessed (e.g., application 102 in FIG. 1, application 200 in FIG. 2). The application may be accessed on a user device (e.g., user device 101 in FIG. 1). The application may be accessed by performing a log-in process. The log-in process may include logging-onto an account. The account may be associated with a hospitality service. The log-in process may include transmitting authentication information associated with the account. For example, the log-in process may include providing a username and a password associated with the account via the application. The log-in process may include a 1-factor, 2-factor, or 3-factor authentication process, for example. The user device may remain logged-in to the account. For example, the user device may remain logged-in to the account if the application is closed. As another example, the user device may remain logged-in to the account until a log-out process is performed.

At step 315, settings of the application may be accessed. The settings may be accessed via a settings page (e.g., settings page 206 in FIG. 2) of the application. The settings may include a mobile entry setting. At step 320, the mobile entry setting may be selected. Selecting the mobile entry setting may include selecting an option to enable the mobile entry setting. Selecting the mobile entry setting may include entering a user input via the user device, such as by engaging with a graphic icon of the application, such as by sliding the icon 209 in FIG. 2. Selecting the mobile entry setting may include enabling a communication setting of the user device. For example, a wireless communication setting of the user device may be enabled. Enabling the communication setting of the user device may include connecting, via the user device, to a communications network (e.g., the network 104 in FIG. 1).

At step 325, in response to the selection of the mobile entry setting, a communication comprising an authorization code may be received. The authorization code may be received in another account associated with the hospitality service account. For example, the authorization code may be received in a message sent to an email account associated with the hospitality service account. The authorization code may include a series of alphanumeric characters.

At step 330, the authorization code may be entered via the application. The authorization code may be entered via an authorization page of the application, such as the page 212 in FIG. 2. The authorization code may be entered using a graphic keyboard, such as the keyboard 214 in FIG. 2, of the application. If the entered authorization code matches the authorization code that was sent, a page may be displayed comprising a selectable option to enable or disable the entry setting, such as the page 215 in FIG. 2.

At step 335, the mobile entry setting may be enabled. Enabling the mobile entry setting may include entering a user input via the user device, such as by engaging with a graphic icon of the application, such as by sliding the icon 219 in FIG. 2. At step 340, responsive to the enablement of the mobile entry setting, an electronic key (e.g., the electronic key 105 in FIG. 1) may be received. The electronic key may include a series of alphanumeric characters. The electronic key may be stored to the user device. The electronic key may be stored in the application.

At step 345, responsive to the enablement of the mobile entry setting, an indication (e.g., indication 220 in FIG. 2) of an access device (e.g., access device 108 in FIG. 1) may be received. The indication of the access device may be received via the application. The access device may be configured to control access to the hospitality service. The application may display a selectable option to authorize the indicated access device.

At step 350, the access device may be authorized. Authorizing the access device may include selecting the selectable option to authorize the access device. At step 355, responsive to the authorization of the access device, communication may be established with the access device. Communication may be established between the user device and the access device. For example, the user device may initiate a secure communication session with the access device.

At step 360, in response to the authorization of the access device, the electronic key may be transmitted to the access device. For example, the user device may transmit the electronic key to the access device via the secure communication session. At step 365, based on the transmitting the electronic key to the access device, the hospitality service may be accessed. The access device may enable access to the hospitality service. After transmitting the electronic key to the access device, it may be determined that the hospitality service cannot be accessed. An indication that the hospitality service cannot be accessed may be transmitted to another device or may be output, such as via the display of the user device.

Steps 310-365 may be performed in a different order. Steps 310-365 or similar steps may be repeated. For example, the steps may be repeated for the hospitality service or with the same access device. As another example, the steps may be repeated to access a different hospitality service or with a different access device. As an illustrative example, the steps may be performed to access a hotel room and then the steps or similar steps may be repeated to access a business center.

The mobile entry setting may be disabled. Responsive to the mobile entry setting being disabled, the electronic key may be deleted or changed. The mobile entry setting may be disabled. Responsive to the mobile entry setting being disabled, the electronic key may be deleted or changed. The electronic key may be deleted or changed in response to a change to data associated with the authorized account. For example, responsive to a change of a password associated with the authorized account, the electronic key may be deleted or changed. Responsive to a physical key or key card being issued, the electronic key may be deleted or changed. After a predetermined period of time, the electronic key may be deleted or changed. Deleting the electronic key may include eliminating electronic key from a device or storage medium storing the electronic key. Deleting the electronic key may include transmitting or storing an indication that the electronic key is no longer associated with the reservation, the user, the user device, or the hospitality service, for example.

Figure 4:
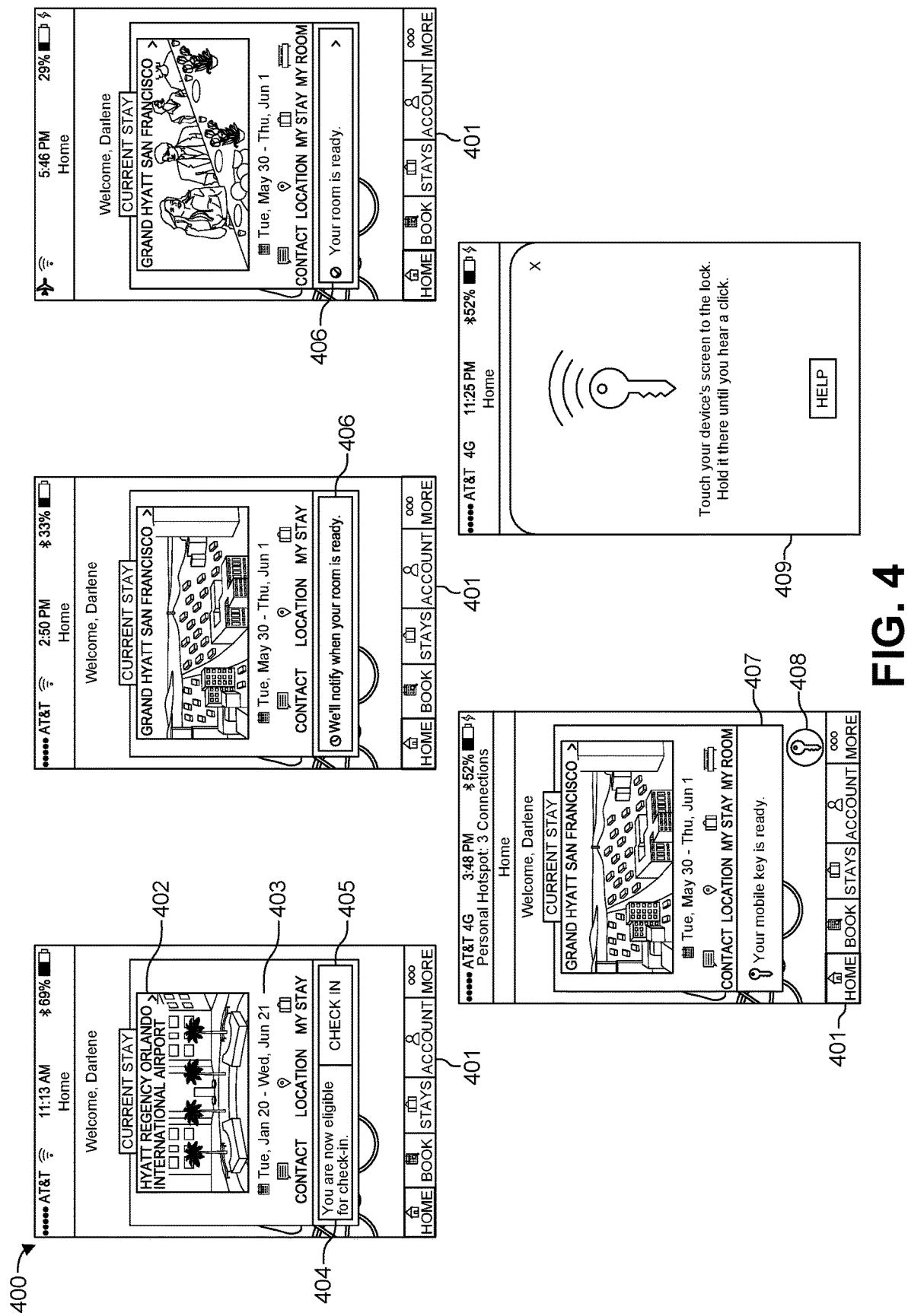
FIG. 4 illustrates an example hospitality service application.

FIG. 4 shows an example hospitality service application 400. The hospitality service application 400 may be the application 102 in FIG. 1 or the hospitality service application 200 in FIG. 2. The hospitality service application 400 may be on a user device (e.g., user device 101 in FIG. 1). The hospitality service application 400 may include a graphic user interface. The hospitality service application 400 may display a check-in page 401 of the hospitality service application 400. The check-in page 401 may display an indication of a place of hospitality 402. For example, the indication of the place of hospitality 402 on check-in page 401 in FIG. 4 is depicted as an indication of the Hyatt Regency Orlando International Airport. The check-in page 401 may display an indication of a period of the reservation 403. For example, the check-in page 401 in FIG. 4 is depicted as an indication of a period of Tuesday, June 20-Wednesday, June 21. The check-in page 401 may display a notification indicating that a user is eligible for check-in 404. The check-in page 401 may display a selectable check-in icon 405.

Responsive to a selection of the selectable check-in icon 405, a check-in process may be performed. The check-in process may be an oral or a physical check-in process, such as a process conducted orally between the guest and an attendant of the hospitality service. The check-in process may be a digital process, such as a process performed on the user device or via the application 400. The check-in process may include the guest indicating that the guest is ready to access the hospitality service. The check-in process may include authenticating the guest. For example, the check-in process may include determining the identity of the guest.

Responsive to a selection of the selectable check-in icon 405, the check-in page 401 may indicate that an alert 406 will be displayed when a hospitality service is available. When the hospitality service is ready, the alert that the room is ready may be displayed. The alert 406 may include a selectable icon. Responsive to a selection of the alert 406, a notification 407 may be displayed indicating that an electronic key associated with the reservation is available. A selectable electronic key icon 408 may be displayed.

Responsive to a selection of the selectable electronic key icon 408, an electronic key page 409 may be displayed. The electronic key page 409 may display an instruction to put the user device in contact with an access device (e.g., access device 108 in FIG. 1) associated with the hospitality service. Responsive to the selection of the selectable electronic key icon 408, communication may be established between the user device and the access device. The access device may be associated with the hospitality service. Establishing communication with the access device may include initiating a secure communication session with the access device. Responsive to the selection of the selectable electronic key icon 408, the electronic key may be transmitted to the access device. For example, the user device may transmit the electronic key to the access device via the secure communication session. The user device may output an indication of the electronic key, such via a display of the user device.

The access device may receive the electronic key from the user device. The access device may determine that the electronic key is associated with an authorized guest. Responsive to determining that the received electronic key is associated with an authorized guest, the access device may allow access to the hospitality service.

Figure 5:
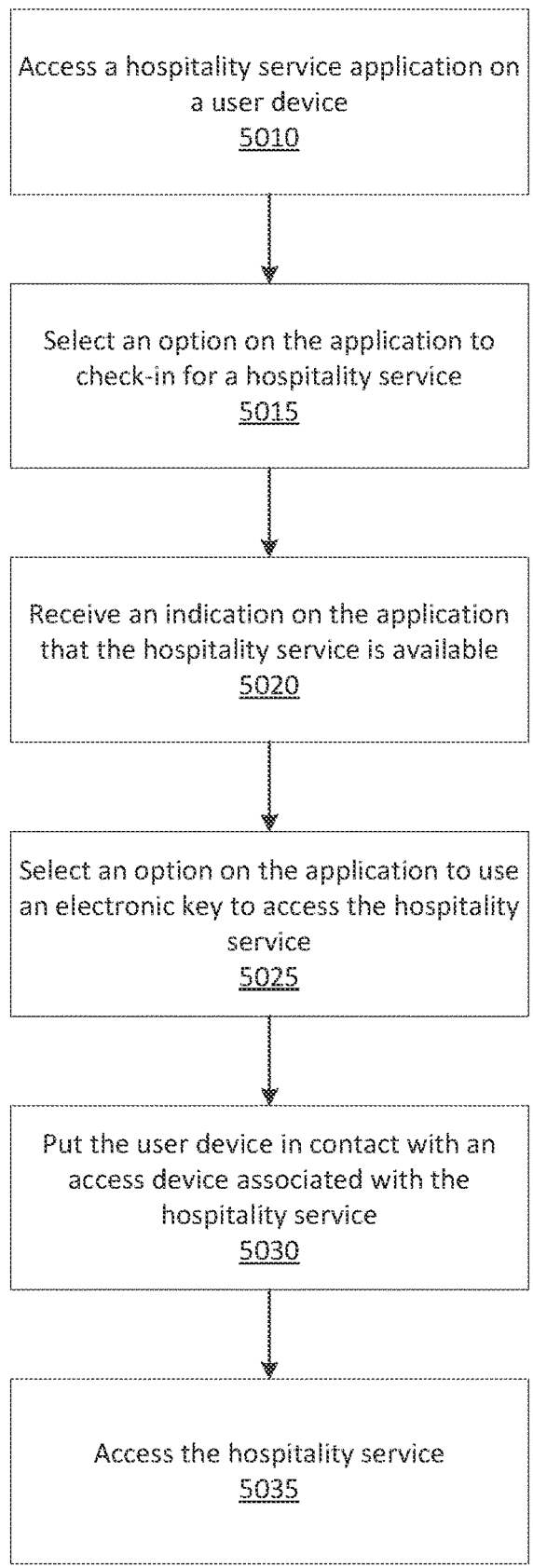
FIG. 5 illustrates a flow chart showing an example process for mobile entry.

FIG. 5 shows an example mobile entry method. At step 510, a hospitality service application may be accessed. The application may be accessed on a user device (e.g., user device 101 in FIG. 1). The application may be accessed on a user device (e.g., user device 101 in FIG. 1). The application may be accessed by performing a log-in process. The log-in process may include logging-onto an account. The account may be associated with a hospitality service. The log-in process may include transmitting authentication information associated with the account. For example, the log-in process may include providing a username and a password associated with the account via the application.

At step 515, an option to check-in for the hospitality service may be selected. The option to check-in may be displayed on a page of the application, such as the check-in page 401 in FIG. 4. The option to check-in may be selected via the application on the user device. Selecting the option to check-in may include selecting a selectable icon on the user interface, such as the selectable check-in icon 405 in FIG. 4.

At step 520, based on the selection of the option to check-in for the hospitality service, an indication that the hospitality service is available may be displayed. The indication that the hospitality service is available may be displayed on the application. The indication may indicate, for example, that the hospitality service is vacant. The indication may indicate, for example, that the hospitality service is ready to be accessed or ready to receive a guest.

At step 525, an option to use an electronic key to access the hospitality service may be selected. The option to use the electronic key may be selected via the application. The option to use the electronic key to access the hospitality service may be selected by selecting a selectable icon on the application, such as the selectable electronic key icon 408 in FIG. 4. Based on the selection of the option to use the electronic key, the user device may establish communication with an access device (e.g., the access device 108 in FIG. 1) associated with the hospitality service. Based on the selection of the option to use the electronic key, instructions may be displayed via the application. For example, instructions to put the user device in contact with the access device may be displayed.

At step 530, the user device may be put in contact with the access device. For example, if the access device be a lock device, the user device may be held against the lock device. Alternatively or additionally, the user device may be positioned within a predetermined distance from the access device. The predetermined distance may be a distance within which the user device and the access device may communicate. For example, the predetermined distance may be a range of a transceiver of the access device. When the user device is in contact with the access device, the access device may receive the electronic key from the user device. When the user device is in contact with the access device, the access device may read the electronic key from a display of the user device, such as from a page of the application. Another device, such as a mechanical key, key card, or keypad may be used in conjunction with the electronic key to access the hospitality service.

At step 535, the hospitality service may be accessed. Responsive to receiving the electronic key, the access device may allow access to the hospitality service. For example, the access device may determine that the received electronic key is associated with an authorized guest. The access device may output an indication that access has been granted to the hospitality service.

The user device may determine that access has been granted to the hospitality service. For example, the user device may determine that access has been granted based on receiving, from the access device, an indication that access has been granted. The user device may output an indication of the granting of access to the hospitality service. For example, the user device may vibrate based on the determination that access has been granted to the hospitality service. The user device may display an indication that access has been granted to the hospitality service, such as via the application.

After transmitting the electronic key to the access device, it may be determined that the hospitality service cannot be accessed. For example, the user device may determine that the attempt to access the hospitality service failed. An indication that the hospitality service cannot be accessed may be transmitted to another device or may be output, such as via the display of the user device.

Steps 510-535 may be performed in a different order. Steps 510-535 or similar steps may be repeated. For example, the steps may be repeated for the hospitality service or with the same access device. As another example, the steps may be repeated to access a different hospitality service or with a different access device. As an illustrative example, the steps may be performed to attend a concert and then the steps or similar steps may be repeated to access open an elevator.

The mobile entry setting may be disabled. Responsive to the mobile entry setting being disabled, the electronic key may be deleted or changed. The electronic key may be deleted or changed in response to a change to data associated with the account. For example, responsive to a change of a password associated with the account, the electronic key may be deleted or changed. Responsive to a physical key or key card being issued, the electronic key may be deleted or changed. After a predetermined period of time, the electronic key may be deleted or changed. Deleting the electronic key may include eliminating electronic key from a device or storage medium storing the electronic key. Deleting the electronic key may include transmitting or storing an indication that the electronic key is no longer associated with the reservation, the user, the user device, or the hospitality service, for example.

Figure 6:
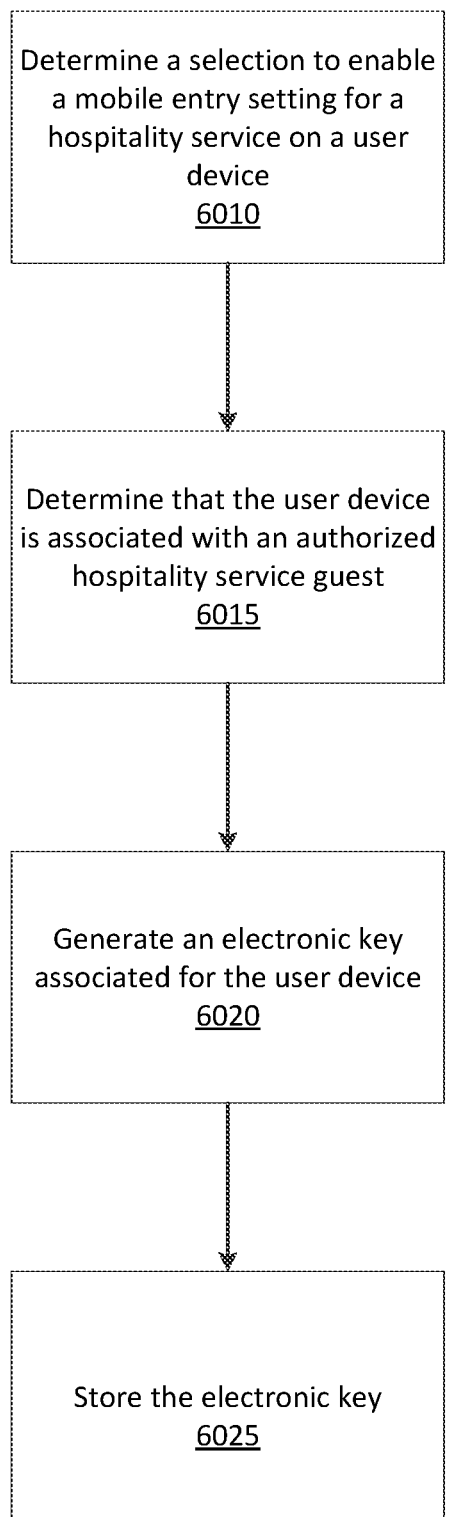
FIG. 6 illustrates a flow chart showing an example process for mobile entry.

FIG. 6 shows an example mobile entry method. At step 610, a selection to enable a mobile entry setting for a hospitality service may be determined. The selection may be via a user device (e.g., user device 101 in FIG. 1). The mobile entry setting may be a setting of the user device or a setting of an application on the user device (e.g., application 102 in FIG. 1, application 200 in FIG. 2, application 400 in FIG. 4). A computing device may determine the selection to enable the mobile entry setting (e.g., computing device 103 in FIG. 1). The computing device may determine the selection to enable the mobile entry setting by receiving an indication of the selection, such as from the user device.

At step 615, responsive to the selection to enable the mobile entry setting, it may be determined that the user device is associated with an authorized guest. The computing device may determine that the user device is associated with the authorized guest. Determining that the user device is associated with an authorized guest may include determining that a reservation has been made for the hospitality service. Determining that the user device is associated with an authorized guest may include determining that the reservation is associated with the user device, for example. Determining that the user device is associated with an authorized guest may include determining that the reservation is associated with the account and that the user device is associated with the account.

The computing device may determine that the reservation is eligible for mobile entry. The reservation may be eligible for mobile entry based on a status of the reservation, such as a ready status or a checked-in status. The reservation may be eligible for mobile entry based on a capability or setting of the user device. The reservation may be eligible for mobile entry based on whether the hospitality service associated with the reservation is eligible for mobile entry. For example, the hospitality service may be eligible for mobile entry if an access device 1080 associated with the hospitality service is configured for mobile entry.

The computing device may determine that the user device is associated with an authorized user by querying a reservation database (e.g., the reservation database 106 in FIG. 1). The reservation database may include a record of reservations, user devices, accounts, or users, for example. The computing device may determine that the reservation database includes an indication of the user device, the account, or the user of the user device, for example. The computing device may determine that the reservation database includes an indication that a reservation associated with the user device, the account, or the user has been made.

Determining that the user device is associated with an authorized guest may include determining that the user device is associated with an authorized hospitality service account. For example, an authorization code may be sent to an email associated with the authorized hospitality service account. A code may be received from the user device, such as via the application. If the code received from the user device matches the sent authorization code, it may be determined that the user device is associated with the authorized hospitality service account.

It may be determined that an electronic key has been generated for the reservation or for the user device. Based on a determination that an electronic key has been generated, it may be determined that parameters associated with the electronic key matches parameters associated with the reservation. For example, it may be determined that a location of a hospitality service of the electronic key matches a location associated with the reservation. It may be determined that dates associated with electronic key match dates associated with the reservation. If the parameters of the electronic key do not match the parameters associated with the reservation, the parameters of at least one of the electronic key or the user device may be modified. If the parameters of the electronic key do not match the parameters associated with the reservation, the electronic key may be deleted.

At step 620, based on the determination that the user device is associated with an authorized hospitality service guest, an electronic key may be generated for the user device. The computing device may generate the electronic key. The electronic key may be a series of alphanumeric characters. The electronic key may be unique to the user device, the user, the account, or the reservation. The electronic key may be associated with a vendor or manufacturer of the access device.

The electronic key may be generated based on a determination that an electronic key has not been generated for the reservation or the user device. The electronic key may be generated based on a determination that the parameters of an existing electronic key do not match the parameters of the reservation. The electronic key may be generated based on a determination that a check-in process has been performed. The check-in process may include a physical or an oral check-in process, such as a process conducted orally between the guest and an attendant of the hospitality service. The check-in process may include a digital process, such as a process performed on the user device or via the application. The check-in process may include the guest indicating that the guest is ready to access the hospitality service. The check-in process may include authorizing the guest.

At step 625, the electronic key may be stored. The computing device may store the electronic key. Storing the electronic key may include transmitting the electronic key to the user device. Storing the electronic key may include transmitting the electronic key to the access device. The electronic key may transmitted to a plurality of devices, such as to the user device and to another device associated with another guest of the hospitality service. The electronic key may be stored on the user device, such as in the application or in the SDK. The electronic key may be stored on a plurality of devices, such as on the user device and on the device associated with the other guest of the hospitality service. The electronic key may be stored on the computing device. The electronic key may be stored on a database (e.g., key database 107 in FIG. 1). The database may include a record of electronic keys for hospitality services. The database may include a record of reservations, accounts, users, or user devices associated with the electronic keys, for example. Steps 610-625 may be performed in a different order. Steps 610-625 or similar steps may be repeated.

Figure 7:
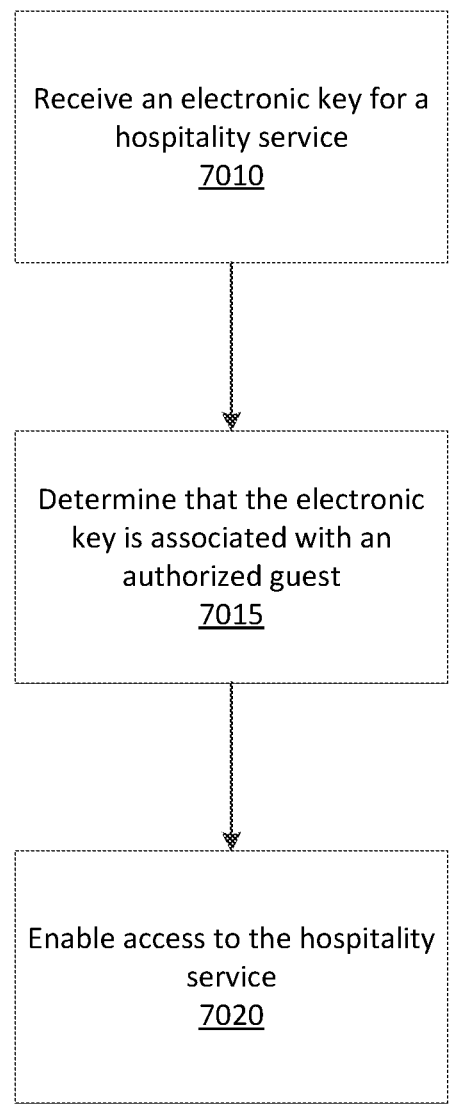
FIG. 7 illustrates a flow chart showing an example process for mobile entry.

FIG. 7 shows an example mobile entry method. At step 710, an electronic key for a hospitality service may be received. The electronic key may be received by an access device associated with the hospitality service (e.g., access device 108 in FIG. 1). The electronic key may be received from a user device (e.g., user device 101 in FIG. 1). The electronic key may be received via a personal area network (PAN), such as a Bluetooth network or a Zigbee network. The electronic key may be received via a local area network (LAN), a wide area network (WAN), a home area network (HAN), or another network. The electronic key may be received via a radio frequency. The electronic key may be received via a secure communication session, such as a secure communication session between the access device and the user device. The electronic key may be received by reading a computer-readable indication of the electronic key on the user device.

The access device may operate a wake mode. The access device may switch from a sleep mode to the wake mode, such as responsive to receiving a signal. The access device may consume less power in the sleep mode than the wake mode. The access device may receive the electronic key in the wake mode.

At step 715, it may be determined that the electronic key is associated with an authorized guest of the hospitality service. The access device may determine that the electronic key is associated with an authorized guest of the hospitality service. Determining that the electronic key is associated with an authorized guest may include querying a database, such as the key database 107 in FIG. 1. Determining that the electronic key is associated with an authorized guest may include determining that the database contains an indication of the electronic key. Determining that the electronic key is associated with an authorized guest may include determining that the database contains an indication that the electronic key is associated with a reservation for the hospitality services, as an example.

Determining that the electronic key is associated with an authorized guest may include transmitting an indication of the electronic key to another device, such as the computing device 103 in FIG. 1. In response, an indication may be received, from the other device, that the electronic key is associated with an authorized guest. In response, an indication may be received, from the other device, to allow access to the hospitality service.

Determining that the electronic key is associated with an authorized guest may include determining that the electronic key matches a key stored on a memory of the access device. The key stored on the memory of the access device may be a key received from another device, such as the computing device 103 in FIG. 1. As an illustrative example, the access device may receive and store a new key each time a reservation for the hospitality service is made.

Based on a determination that the electronic key is not associated with an authorized guest, an access attempt may be recorded. Based on the determination that the electronic key is not associated with the authorized guest, access to the hospitality service may be denied. For example, if the access device is a lock, the lock may remain locked. Based on a number of access attempts, such as failed access attempts, access to the hospitality service may be denied. Based on the number of access attempts, an indication of the access attempts may be transmitted, such as to another device. An indication of the failure to access the hospitality service may be transmitted to the user device. Based on the number of access attempts, an indication may be output. For example, an alarm may be triggered.

At step 720, based on a determination that the electronic key is associated with an authorized guest of the hospitality service, access to the hospitality service may be enabled. The access device may enable access to the hospitality service. For example, if the hospitality service includes a controlled area, the access device may allow entrance to the controlled area. For example, if the access device is a door or a gate, the door or gate may open. If the access device is a lock, the lock may unlock. If the hospitality service is an amenity, use of the amenity may be allowed. If the hospitality service is a physical commodity, the physical commodity may be retrieved by a user of the user device. The physical commodity may be delivered to the user. Access to a plurality of hospitality services may be enabled. For example, the access device may allow entrance to a plurality of controlled areas. Steps 710-720 may be performed in a different order. Steps 710-720 or similar steps may be repeated.

An access device may be configured to operate in a sleep/wake power cycle. The access device may be powered by batteries. The sleep/wake cycle of the access device may be configured to maximize the period of time that a set of batteries lasts. The access device may be configured to operate in a sleep mode for static time increments. The access device may wake periodically to check for control messages from an external source (e.g., an upstream control point or a lock server). In the sleep mode, the access device may stop supplying power to any unneeded components, thereby conserving power. However, the access device in the sleep mode may not respond to signal from an external source. As a result, with a sleep/wake schedule, if an unlock message is sent to a specific access device when it is in sleep mode, the access device may not respond to the unlock message. The access device may not provide access to a hospitality service or controlled area until it cycles into its wake mode. Consequently, a guest may wait for a period of time (i.e., wait until the access device is in wake mode) in order to gain access to the hospitality service or controlled area.

Access to hospitality services or controlled areas of a hotel or other place of hospitality may be automatically enabled using an access device. The access device may be connected to a network (e.g., online). The access device may use one or more positioning methods, including but not limited to control plane locating, Global Positioning Services (GPS), assisted GPS, Global Navigation Satellite System (GNSS), Wireless Fidelity (Wi-Fi) positioning, Bluetooth positioning, infrared-based proximity positioning, and other indoor positioning services. The access device may be used in conjunction with a mobile device of a guest (e.g., a smart phone) to determine with high fidelity the location of a guest, such as within a place of hospitality.

As an example, a GNSS may include a device or system that may estimate its location based, at least in part, on signals received from space vehicles (SVs). In particular, such a device or system may obtain "pseudo-range" measurements including approximations of distances between associated SVs and a navigation satellite receiver. In a particular example, such a pseudo-range may be determined at a receiver that is capable of processing signals from one or more SVs as part of a Satellite Positioning System (SPS). Such an SPS may be, for example, a GPS, Galileo, Glonass, to name a few, or any SPS developed in the future. To determine its location, a satellite navigation receiver may obtain pseudo-range measurements to three or more satellites as well as their positions at time of transmitting. Based on the SV orbital parameters, these positions can be calculated for any point in time. A pseudo-range measurement may then be determined based, at least in part, on the time a signal travels from an SV to the receiver, multiplied by the speed of light. Other types of SPS may be used.

It may be determined that a guest authorized to access a hospitality service or controlled area is approaching or proximate to the hospitality service or controlled area. Based on the location of the guest, an unlock control message may be transmitted to the access device associated with or at an access point to the hospitality service or the controlled area. The access device may be online or offline. If the access device is offline, the access device may not be connected to a control network. If the access device is online, the access device may not be connected to the control network. The control network may communicate with the access device during enhanced operations, administration, and maintenance (OA & M) processes. The control network may run from a control point to intermediate and/or central servers to the access device. The control network may be any type of network, such as a personal area network (PAN), local area network (LAN), wide area network (WAN), home area network (HAN), etc. The control network may be a PAN such as a Zigbee network.

An access device may be powered by one more batteries. The batteries may be depleted based on use of the access device. If the access device is in a full power or ready mode, the access device may consume more battery power. If the access device is in a sleep or low power mode, the access device may consume less battery power. In order to maximize battery life, a sleep/wake cycle power management scheme may be implemented. According to the sleep/wake cycle power management scheme, the access device may operate in a sleep mode with close to zero power consumption for static time increments. The access device may wake periodically to check for control messages and events, such as a control message or event from an upstream control point or server (e.g., a lock server housed in a central location at an on-site or remote facility). Such an approach may be implemented for managing power consumption of battery-operated end points of any kind on a large, industrial network such as, for example, a supervisory control, and data acquisition (SCADA) network.

Figure 8:
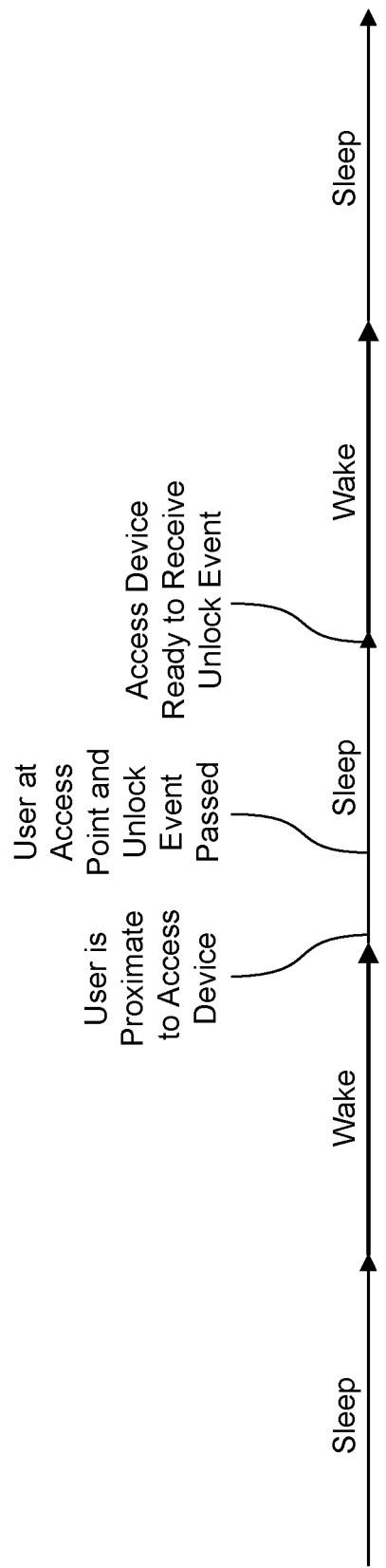
FIG. 8 illustrates an example sleep/wake cycle of an access device.

One or more control messages may be transmitted to an access device. The control message may be transmitted to an access device based on a location of an authorized guest approaching or proximate to the access device. The access device may be configured to operate in a static sleep/wake cycle. If the access device is operating in a wake mode and receives the control message, the access device may permit access to the hospitality service or controlled area, for example, by unlocking. If the access device is operating in a sleep mode, the access device may not respond to receiving the control message until it switches into the wake mode. Thus, with a static sleep/wake cycle, such as that depicted in FIG. 8, if the control message (e.g., an unlock event) is transmitted when the access device is in the sleep mode, then the access device may respond after a delay. The access device may not be ready to receive a control message until a period of time after the control message is originally sent. As a result, a guest that arrives at the access device when the access device is in the sleep mode may have to wait until the access device cycles into the wake mode in order to gain access to the hospitality service or controlled area.

Alternatively, a power management scheme for access devices with a dynamic sleep/wake cycle may be implemented. The location of a guest that is authorized to access a hospitality service or controlled area (e.g., a guest room) may be determined. The location may be determined using conventional location-based technology (e.g., GPS, GNSS, Wi-Fi positioning, cell tower triangulation, proximity sensors). Based on the location of the guest, such as based on the guest approaching the access device or the controlled area, a control message may be transmitted to the access device in advance of the approach. The control message may instruct the particular access device to operate in a wake mode. Thus, when the guest is proximate to the access device and an additional control message to unlock is transmitted to the access device, the access device may be ready to receive and respond to an additional control message. By configuring the access device to operate in a dynamic sleep/wake cycle that is dependent on a guest's location, energy efficiency may be increased and costs associated with replacing the batteries (or other power sources) of access devices may be reduced.

Figure 9:
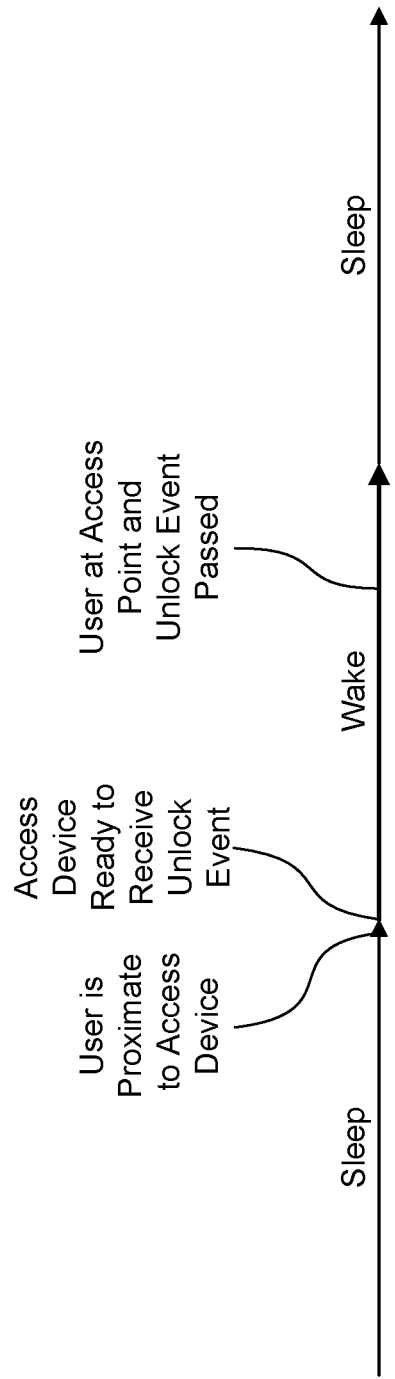
FIG. 9 illustrates an example sleep/wake cycle of an access device.

An example of a dynamic sleep/wake cycle for an access device is depicted in FIG. 9. The access device initially may be operating in a sleep mode. When a user is proximate to the access device (e.g., when the user enters the hallway with the access device), a first control message may be transmitted to the access device. This first control message may instruct the access device to switch to a wake mode. In the wake mode, the access device may be ready to receive an unlock event. Then, when the user arrives at the access point and a second control message including the unlock event is sent to the access device, the access device may respond right away to the unlock event and provide access to a hospitality service or controlled area associated with the access device.

A user of a mobile device (e.g., user device 101 in FIG. 1) may download an application, such as application 102 in FIG. 1, on the mobile device. The user may log-in, via the application on the mobile device, to an account associated with a hospitality service. After logging-in to the account, the user may select, via the application on the mobile device, an option to enable a mobile entry setting. Based on the enablement of the mobile entry setting on the mobile device, it may be determined that the mobile device is associated with an authorized guest. The mobile device may be determined to be associated with an authorized guest by determining that a reservation has been made for the hospitality service. It may be determined that the reservation is associated with the account and that the mobile device is associated with the account.

It may be determined that the reservation is eligible for mobile entry. The reservation may be eligible for mobile entry based on a status of the reservation, such as a ready status or a checked-in status. The reservation may be eligible for mobile entry based on a capability or setting of the mobile device. As an illustrative example, the reservation may be eligible for mobile entry based on a security setting of the mobile device. The reservation may be eligible for mobile entry based on whether the hospitality service associated with the reservation is eligible for mobile entry. For example, the hospitality service may be eligible for mobile entry if an access device (e.g., access device 108 in FIG. 1) associated with the hospitality service is configured for mobile entry.

It may be determined that the mobile device is associated with an authorized user by querying a reservation database (e.g., reservation database 106 in FIG. 1). It may be determined that the reservation database includes an indication of the mobile device, the account, or the user of the mobile device, for example. It may be determined that the reservation database indicates that a reservation (e.g., reservation 109 in FIG. 1) associated with the mobile device, the account, or the user has been made.

It may be determined that an electronic key (e.g., electronic key 105 in FIG. 1) has been generated for the mobile device. The electronic key may be a series of alphanumeric characters, for example. The electronic key may be configured to enable access to the hospitality service. The electronic key may be configured to enable access to the hospitality service via the access device associated with the hospitality service. The electronic key may be configured to enable access to a plurality of hospitality services. As an illustrative example, the electronic key may be configured to enable access to one or more hotel rooms. As another illustrative example, the electronic key may be configured to enable access to a fitness center, enable access an Internet service, and enable redemption of a meal. The electronic key may be associated with a vendor or a manufacturer of the access device.

Based on a determination that an electronic key has been generated for the mobile device, parameters associated with the electronic key may be determined to match parameters associated with the reservation. For example, it may be determined that a location of a hospitality service associated with the electronic key matches a location associated with the reservation. Based on a determination that the mobile device is associated with an authorized guest, the electronic key may be generated for the mobile device. Based on a determination that an electronic key has not been generated for the reservation or the mobile device, the electronic key may be generated for the mobile device.

The electronic key may be stored to a key database (e.g., key database 107 in FIG. 1). The electronic key may be transmitted to the mobile device, such as via a (e.g., network 104 in FIG. 1). The electronic key maybe transmitted to the mobile device, based on a location of the mobile device. For example, the electronic key may be transmitted to the mobile device based on the mobile device arriving at a place of hospitality. The electronic key may be stored on the memory of the mobile device. The electronic key may be stored on a plurality of devices, such as on the mobile device and on the other device associated with the other guest. The electronic key may be stored on the access device.

The application may indicate a status of the access device, such as a locked status, unlocked status, sleep mode status, or wake mode status. The mobile device may transmit a signal to the access device, such as to switch to another status or operating mode. The user may select to send the signal via the application. For example, the user may select an "unlock" button in a user interface of the application to transmit a control message to the access device. Alternatively, the mobile device may transmit the control message to the access device independent of a user input. For example, the mobile device may transmit the control message to the access device based on a location of the mobile device being within a threshold distance of the access device. As a result, the access device may be in an operating mode in which the access device may receive the electronic key when the mobile device is proximate the access device.

Based on a determination that the mobile device is outside the threshold distance of the access device, a control message may be transmitted to the access device commanding the access device to operate in a sleep mode. The control message may command the access device to operate in the sleep mode for a longer period of time, such as to conserve battery life.

Figure 10:
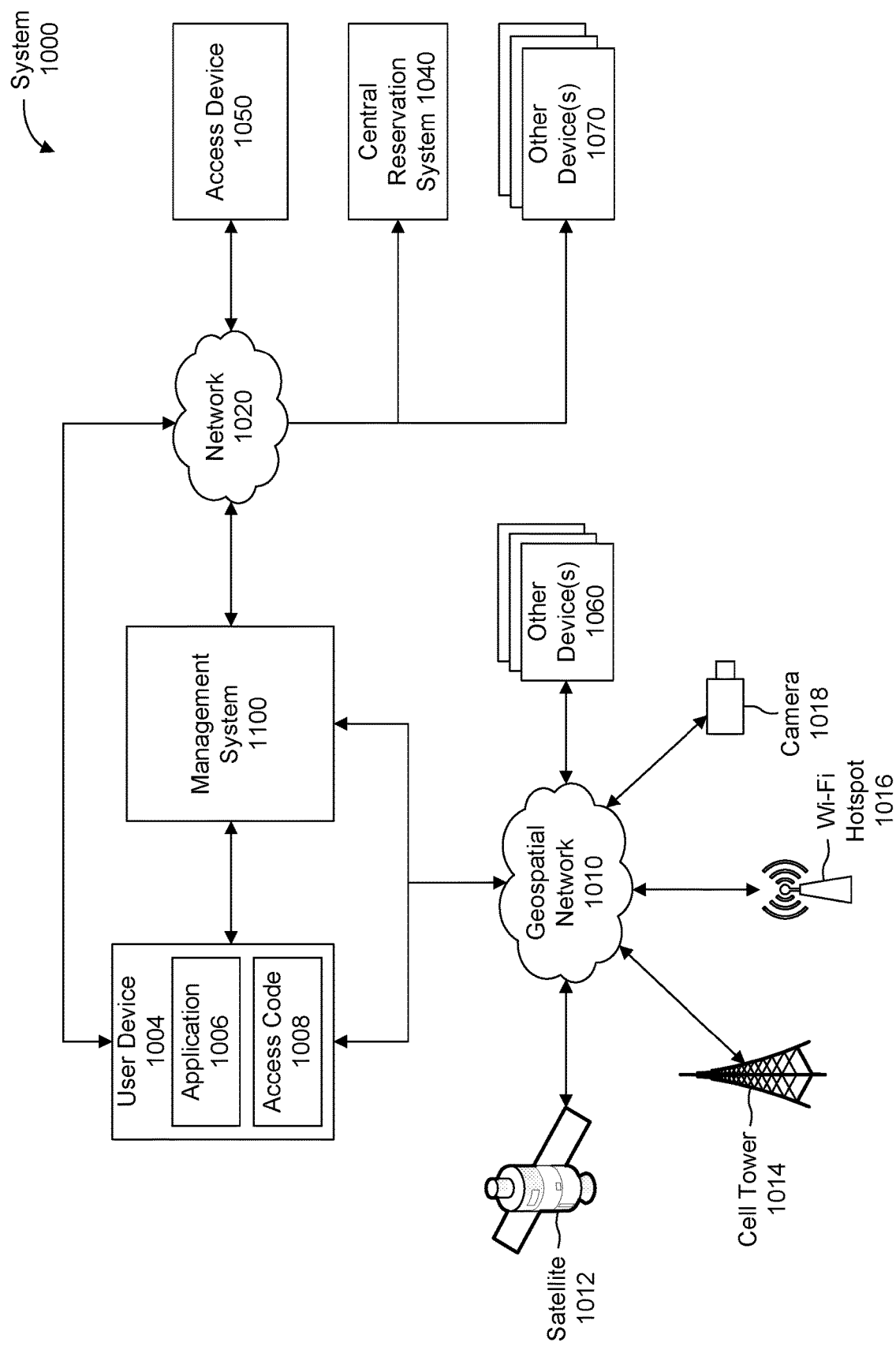
FIG. 10 illustrates an example framework for providing access to a controlled area.

FIG. 10 shows an example framework for providing access to a hospitality service. A system 1000 for providing access to a controlled area may include a user device 1004 and an access device 1050. The access device 1050 may be configured to control access to the hospitality service. The access device 1050 may be an electronic lock or a component of a lock. The access device 1050 may be a user interface, such as a touchscreen, configured to grant access to functionalities of a device.

The access device 1050 may be configured to receive an electronic key. The electronic key 108 may be configured to unlock one or more access devices 150 (e.g., access device 108 in FIG. 1 or access device 150 in FIG. 10). In particular, the electronic key may be a VGK. The electronic key may include a string of alphanumeric characters. The access code may be dynamic (e.g., for one time use and to change thereafter) or static. The electronic key may be limited to unlocking access devices for controlled areas that a user (e.g., of user device 1004) is authorized to access. For example, if a user had a room reservation at a hotel, the access code may be limited to providing the user with access to her reserved room and other locations to which the reservation entitles the user (e.g., a fitness center, a parking lot). Thus, if the reservation of the user does not give the user access rights to a VIP room, then the access code may not provide the user with access to the VIP room. The electronic key may also be limited to unlocking access devices during a specific period of time that the user of the user device 1004 is authorized to access the controlled locations. For example, if a user has a reservation at a hotel for three days, then the electronic key may only provide the user with access to one or more controlled locations at the hotel for the three days of her reservation.

The access device 1050 may be configured to determine that the electronic key is associated with an authorized guest. The access device 1050 may have access to a database of electronic keys assigned to authorized guests. The access device 1050 may query the database to determine whether the received electronic key is an electronic key associated with an authorized guest. Alternatively or in addition, the access device 1050 may be in communication with another device that determines that the electronic key is associated with an authorized guest. Alternatively or in addition, an electronic key may have been stored on the access device 150. The access device 1050 may determine that the electronic key is associated with an authorized guest by determining that the electronic key matches the key stored on the access device 1050.

Responsive to determining that the received electronic key is associated with an authorized guest, the access device 1050 may be configured to allow access to the hospitality service. For example, if the hospitality service includes a controlled area, the access device 1050 may allow entrance to the controlled area. If the hospitality service is an amenity, a guest may use the amenity. If the hospitality service is a physical commodity, the physical commodity may be given to the guest.

The user device 1004 may be a cellphone, a wireless phone, a smart phone, a tablet, an electronic organizer, a pager, or other network device. The user device 1004 may be connected to a management system 1100, one or more networks (e.g., a geospatial network 110, a network 120), and additional device(s) 160, 170 via the one or more networks. The user device 1004 may include an application 1006 (e.g., application 102 in FIG. 1). The user device 1004 may include an electronic key (e.g., electronic key 105). The application 1006 and the electronic key may be stored in a memory (not depicted) of the user device 1004. The application 106 may be a software application having a user interface (e.g., user interface in FIG. 2 or user interface in FIG. 4). The application 1006 may be configured to run on the user device 1004. The application 1006 may store one or more settings associated with unlocking one or more access devices (e.g., access device 1050). Specifically, the application may store settings indicating when a control message for unlocking an access device is to be sent to the access device. As an example, the application may store a setting indicating that a control message for unlocking an access device should be sent to the access device when a location of the user device 104 is less than a predefined distance away from the access device. As another example, the application may store a setting indicating that a control message for unlocking an access device should be sent to the access device when a user provides a specific input into the user device 1004.

The system 1000 may also include a management system 1100. The management system 1100 may be a collection of different devices and servers running various software components. The management system 1100 may be connected to the user device 1004, one or more networks (e.g., a geospatial network 1010, a network 1020), and additional device(s) 1060, 1070 via the one or more networks (e.g., satellite 1012, central reservation system 1040). The management system 1100 may be configured to manage one or more access devices (e.g., access device 1050) of the system 1100. In certain aspects, the management system 1100 may include a lock server. The lock server may be configured to verify information regarding the user (e.g., credentials, access keys) and issue one or more control messages to an access device (e.g., access device 1050).

The system 1000 may also include an access device 1050. The access device 1050 may be a locking device that secures a door or other access point to a controlled area, such as a room, an elevator, a parking lot, a fitness center, or a VIP club. In particular, the access device 1050 may be an electronic lock such as a RFID lock capable of being controlled by one or more of the user device 1040, the management system 1100, and other devices. While only a single access device 1050 is depicted in FIG. 10, those of ordinary skill in the art would appreciate that the system 1000 may include any number of access devices capable of accomplishing the methods disclosed herein.

The user device 1004 and the management system 1100 may be connected to the geospatial network 1010 via a wired or wireless connection. The geospatial network 1010 may be a local area network, a wide area network, an intranet, an extranet, the Internet, or any other type of network known in the art. The geospatial network 1010 may be configured to allow data to be exchanged between devices connected to the geospatial network 1010, including the user device 1004, the management system 1100, and other devices such as a satellite 1012, a cell tower 1014, a Wi-Fi hotspot 1016, a camera 1018, and other device(s) 1060. Other device(s) 1060 may include one or more additional satellites, cell towers, Wi-Fi hotspots, and cameras as well as other devices such as a server, a desktop or laptop personal computer, a tablet, a mobile device, or any other type of computer system or device. In various aspects, the geospatial network 1010 may support communication via any suitable wired or wireless general data networks, such as types of Ethernet networks. Additionally, the geospatial network 110 may support communication via telecommunications/telephony networks, such as analog voice networks or digital fiber communications networks, and communication via storage area networks (SANs), such as Fiber Channel SANs, or communication via any other suitable type of network and/or protocol.

The geospatial network 1010 may connect resources aimed at coordinating and sharing geographical data and other location-based data regarding objects. In particular, the geospatial network 1010 may connect one or more devices capable of providing location data and/or determining a location of the user device 1004. For example, the geospatial network 1010 may include a GPS or GNSS satellite (e.g., satellite 112 and other device(s) 160) capable of providing a location of the user device 1004. As another example, when the user device 1004 is a cell phone, the geospatial network 1010 may include a group of radio towers (e.g., cell tower 1014 and other device(s) 1060) that can provide a general location of the user device 1004 based on the strength of the signal that they receive from the user device 1004. As yet another example, when the user device 1004 is within a place of hospitality, the geospatial network 1010 may include one or more proximity sensors (e.g., Wi-Fi hotspot 1016, camera 1018, and other device(s) 1060) that are located within the place of hospitality to detect the user device 1004 and determine its location at the place of hospitality.

The user device 1004 and the management system 1100 may also be connected to the network 1020 via a wired or wireless connection. Similar to the geospatial network 1010, the network 1020 may be a local area network, a wide area network, an intranet, an extranet, the Internet, or any other type of network known in the art. The network 1020 may be configured to allow data to be exchanged between devices connected to the network 1020 or other networks connected to the network 1020. In various aspects, the network 1020 may support communication via any suitable wired or wireless general data networks, such as types of Ethernet networks. Additionally, the network 1020 may support communication via telecommunications/telephony networks, such as analog voice networks or digital fiber communications networks, via SANs, such as Fibre Channel SANs, or via any other suitable type of network and/or protocol. In certain aspects, the network 1020 may be a PAN such as a Zigbee network.

The devices connected to network 1020 may include the user device 1004, the management system 1100, a central reservation system 1040, the access device 1050, and other device(s) 1070. The central reservation system 1040 may be a collection of different devices and servers running various software components. The central reservation system 1040 may store and distribute information regarding one or more places of hospitality. Specifically, the central reservation system 1040 may store information regarding reservations made by guests at a place of hospitality. Such information may be stored in one or more databases or other organizational formats. The reservations may indicate a number of controlled areas that a guest is authorized to access. For example, the reservations may indicate that a particular guest has access rights to a room at the place of hospitality. The reservations may also indicate that the particular guest has access rights to a fitness center located at the place of hospitality. The other device(s) 1060 may include a server, a desktop or laptop personal computer, a tablet, a mobile device, or any other type of computer system or device.

Figure 11:
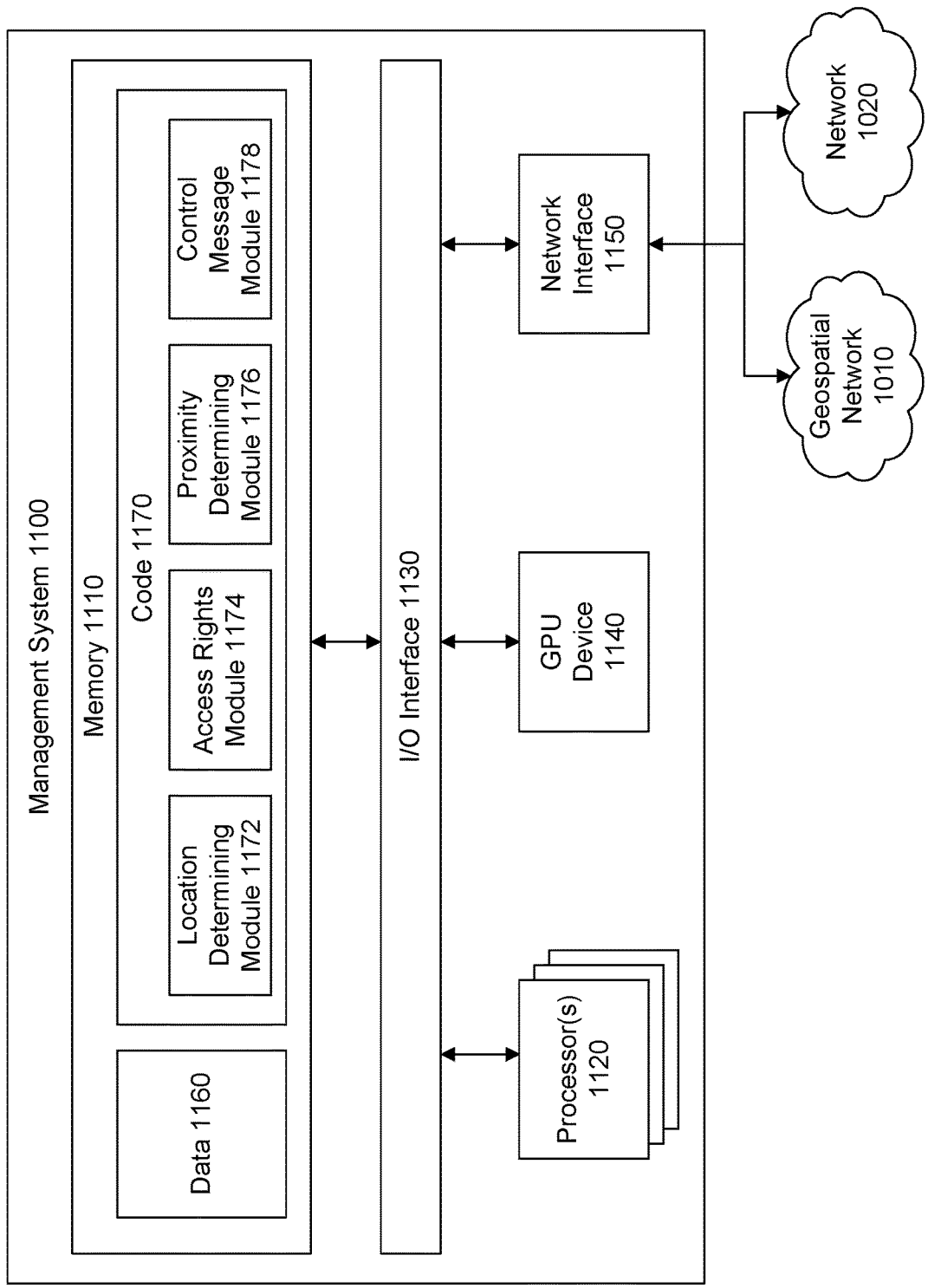
FIG. 11 illustrates an example management system for managing access devices.

FIG. 11 shows an example management system 1100. The management system 1100 may include a memory 1110 and one or more processor(s) 1120. The memory 1110 may include any type of computer-readable medium, such as a memory device (e.g., random access, flash memory, and the like), a magnetic or optical medium (e.g., a CD, DVD, Blu-ray®, and the like), firmware (e.g., an erasable programmable read only memory), or any other storage medium. The memory 1110 may store computer-readable instructions that instruct the management system 1100 to perform certain processes. In particular, the memory 1110 stores code 1170 including a plurality of modules: a location determining module 1172, an access rights module 1174, a proximity determining module 1176, and a control message module 1178. The modules may include logic embodied as hardware, firmware, or a collection of software written in a known programming language. Each of the modules may be executed by at least one of the processor(s) 1120. The memory 1110 may also store data 1160. The data 1160 may include data relating to the place of hospitality such as a virtual map of the place of hospitality (see FIG. 12), the location of access devices and controlled areas at the place of hospitality, access keys for access devices, and reservation information. The data 1160 may also include settings indicating when control messages are to be sent to an access device (e.g., access device 1050). Specifically, such settings may indicate when a control message for configuring the access device 1050 to operate in a wake mode is to be sent to the access device.

The processor(s) 220 may be any suitable processors capable of executing instructions. For example, in various aspects, the processor(s) 220 may be general-purpose or embedded processors implementing any of a variety of instruction set architectures (ISAs), such as the x86, PowerPC, SPARC, or MIPS ISAs, or any other suitable ISA. In certain aspects, each of the processor(s) 1120 may commonly, but not necessarily, implement the same ISA.

The management system 1100 may also include a graphics processing unit (GPU) 1140. GPU 1140 may participate in providing graphics rendering and/or physics processing capabilities. GPU 1140 may, for example, include a highly parallelized processor architecture specialized for graphical computations. In some aspects, the processor(s) 1120 and the GPU 1140 may be implemented as one or more of the same type of device.

In addition, the management system 1100 may include an input/output (I/O) interface 1130. The I/O interface 1130 may be configured to coordinate I/O traffic between the processor(s) 1120, the memory 1110, and any peripherals in the device, including a network interface 1150 or other peripheral interfaces. In some aspects, the I/O interface 1130 may perform any necessary protocol, timing or other data transformations to convert data signals from one component (e.g., the memory 1110) into a format suitable for use by another component (e.g., the processor(s) 1120). In some aspects, the I/O interface 1130 may include support for devices attached through various types of peripheral buses, such as a variant of the Peripheral Component Interconnect (PCI) bus standard or the Universal Serial Bus (USB) standard. In some aspects, the function of the I/O interface 1130 may be split into two or more separate components, such as a north bridge and a south bridge. Also, in some aspects some or all of the functionality of the I/O interface 1130, such as an interface to the memory 1110, may be incorporated directly into the processor(s) 1120.

The network interface 1150 may be configured to allow data to be exchanged between the management system 1100 and other devices attached to the geospatial network 1010 and/or the network 1020. In various aspects, the network interface 1150 may support communication via any suitable wired or wireless general data networks, such as types of Ethernet networks, for example. Additionally, the network interface 1150 may support communication via telecommunications/telephony networks, such as analog voice networks or digital fiber communications networks, via storage area networks, such as Fibre Channel SANs, or via any other suitable type of network and/or protocol.

The components of the management system 1100 may be located on a number of different servers and/or devices. In some aspects, the functionality of some of the components of the management system 1100 may not be provided and/or other additional functionality may be available.

Figure 12:
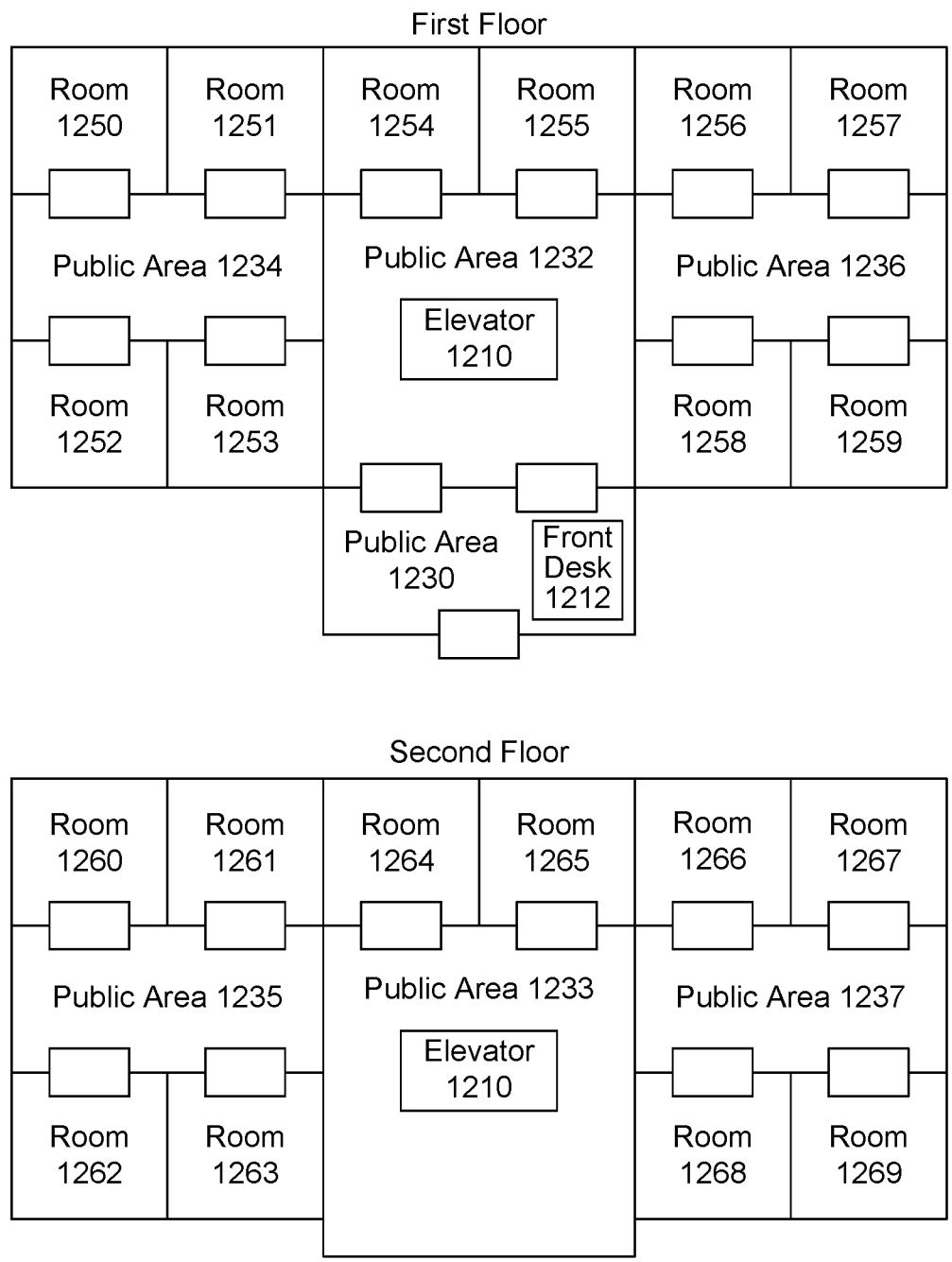
FIG. 12 illustrates an example virtual map of a place of hospitality.

FIG. 12 shows an example virtual map of a place of hospitality. As shown in the virtual map, the place of hospitality may include a first floor and a second floor. On the first floor, there may be a public area 1230 near a front entrance of the place of hospitality including a front desk 1212. The first floor may also include public areas 1232, 1234, 1236 and rooms 1250-1259. On the second floor, there may be public areas 1233, 1235, 1237 and rooms 1260-1269. An elevator 1210 may be located in a central location of the place of hospitality. The elevator may extend from the first floor to the second floor.

A virtual map such as the one depicted in FIG. 12 may be used by systems and methods disclosed herein to provide access to a controlled area. Specifically, the management system 1100 may use the virtual map to monitor the location of a device (e.g., user device 1004) relative to a controlled area. The controlled area may be, for example, any one of rooms 1250-1269. When the device is recognized as being in certain predetermined locations relative to the controlled area (e.g., entering a particular area of the place of hospitality that is proximate to the controlled area), the management system 1100 may transmit a control message to an access device (e.g., access device 1050) associated with the controlled area. In particular, when the user device is within a first area proximate to the controlled area, the management system 1100 may transmit a first control message to the access device associated with the controlled area to configure the access device to operate in a wake mode (i.e., a mode ready for receiving an unlock event). Then, when the user device is within a second area proximate to the controlled area, the management system 1100 may transmit a second control message including an unlock event to the access device associated with the controlled area. The access device, upon receiving the second control message, may unlock and provide access to the controlled area.

As an illustrative example, assume that a user with the user device 1004 is walking towards the room 1260. The room 1260 may be a controlled area, and the user may be authorized to access the room 1260. The access device 1050 may be configured to provide access to the room 1260. The user may enter the place of hospitality and be located in the public area 1230. The management system 1100, upon detecting that the user device 1004 is located in the public area 1230, may transmit a first control message to the access device 1050 to configure the access device 1050 to operate in a wake mode. In the wake mode, the access device 1050 may be configured to receive an unlock event instructing the access device 1050 to unlock and provide access to the room 1260. The user may walk through the public areas 1230, 1232 and take the elevator 1210 to the second floor. The management system 1100, upon detecting that the user device 1004 has exited the elevator 1210 on the second floor, may transmit a second control message including an unlock event to the access device 1050. The access device 1050 receiving the second control message may unlock to provide the user with access to the room 1260. The user arriving at the door to the room 1260 may then actuate a handle on the door of the room 1260 to gain access to the room 1260 without having to present a key card.

In certain aspects, a virtual map such as the one depicted in FIG. 12 may be stored in the memory 1110 of the management system 1100. The management system 1100 may use the virtual map to determine when a device (e.g., user device 1004) is within certain area of the place of hospitality. In particular, the management system 200 may use the virtual map to determine when the user device 1004 is within one or more areas proximate to a controlled area. In other aspects, the virtual map of FIG. 5 may be stored in a device/server separate from the management system 1100. For example, the virtual map may be stored in a remote server. The separate device/server may be connected to network 1020 and therefore accessible to the management system 1100. The management system 1100 may connect to the separate device/server via network 1020 to obtain data regarding the virtual map.

Figure 13:
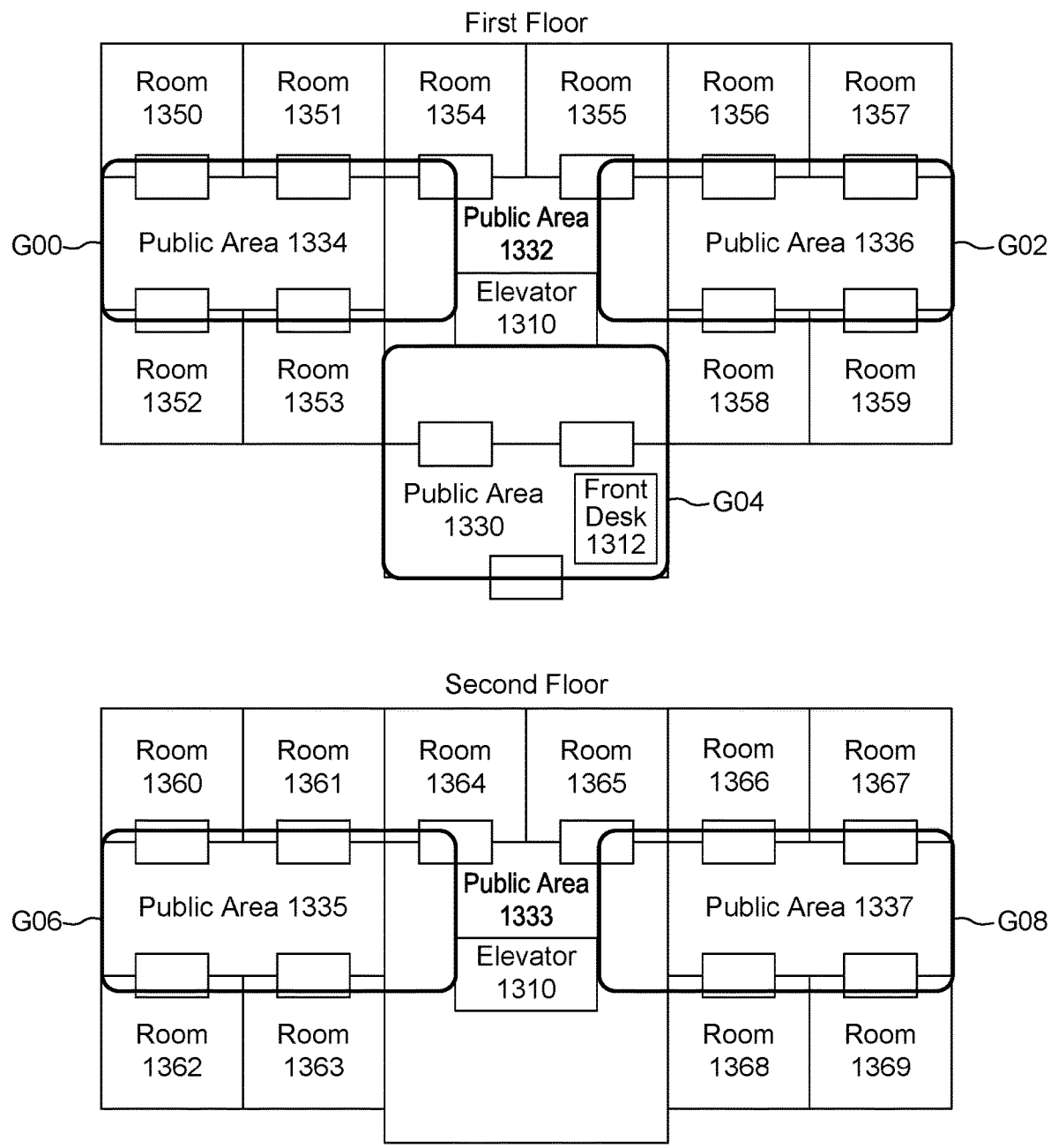
FIG. 13 illustrates an example virtual map of a place of hospitality.

FIG. 13 depicts the example virtual map of the place of hospitality now including a plurality of geofences G00-G08. A geofence may be a virtual barrier. The plurality of geofences G00-G08 may be set up utilizing the virtual map depicted in FIG. 13 in conjunction with a radio map of the place of hospitality based on the specific signature of various frequencies in the place of hospitality. The plurality of geofences G00-G08 may be set up in order to determine ingress, egress, and pivots through the place of hospitality by a guest.

In particular, the plurality of geofences G00-G08 may be used by systems and methods disclosed herein to set up an alert for when a device (e.g., user device 1004) enters a particular area defined by the geofences. For example, the geofence G04 may define an area near a front entrance of the place of hospitality. Accordingly, the geofence G04 may be used to monitor when a device has passed through the geofence G04 and entered the area near the front entrance. The plurality of geofences G00-G08 may be placed on the virtual map of the place of hospitality to optimize when to transmit one or more control messages to a particular access device (e.g., access device 1050). For example, the geofence G04 placed optimally at the entrance of the place of hospitality may alert the management system 1100 of when to transmit a first control message to the access device 1050 to configure the access device 1050 to operate in a wake mode. As another example, the geofence G06 may be placed optimally in a hallway leading to the access device 1050 (assuming that the access device 1050 is located on the door to the room 1360) in order to trigger when to transmit a second control message to the access device 1050 to unlock.

Figure 14:
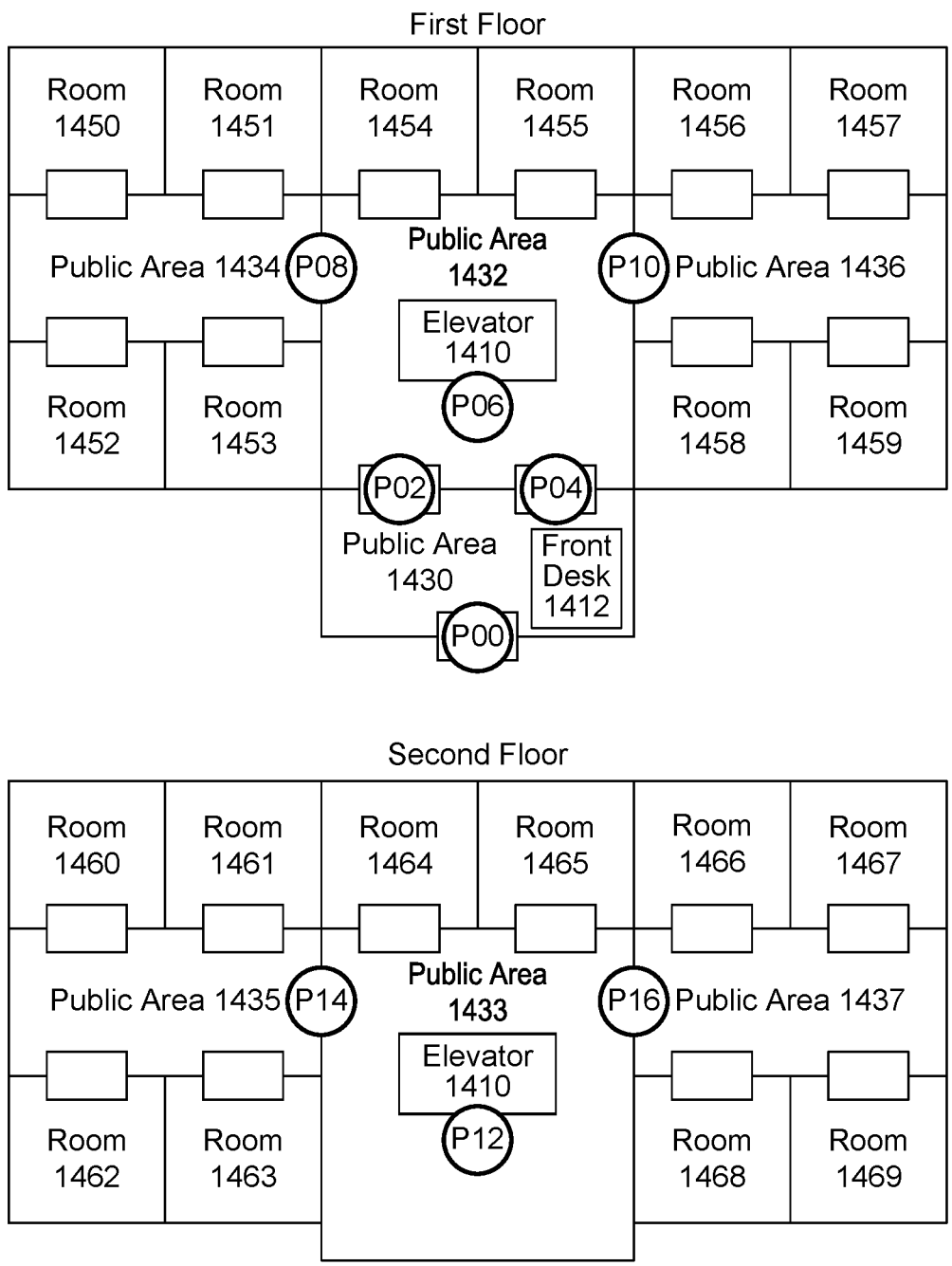
FIG. 14 illustrates an example virtual map of a place of hospitality.
Figure 15:
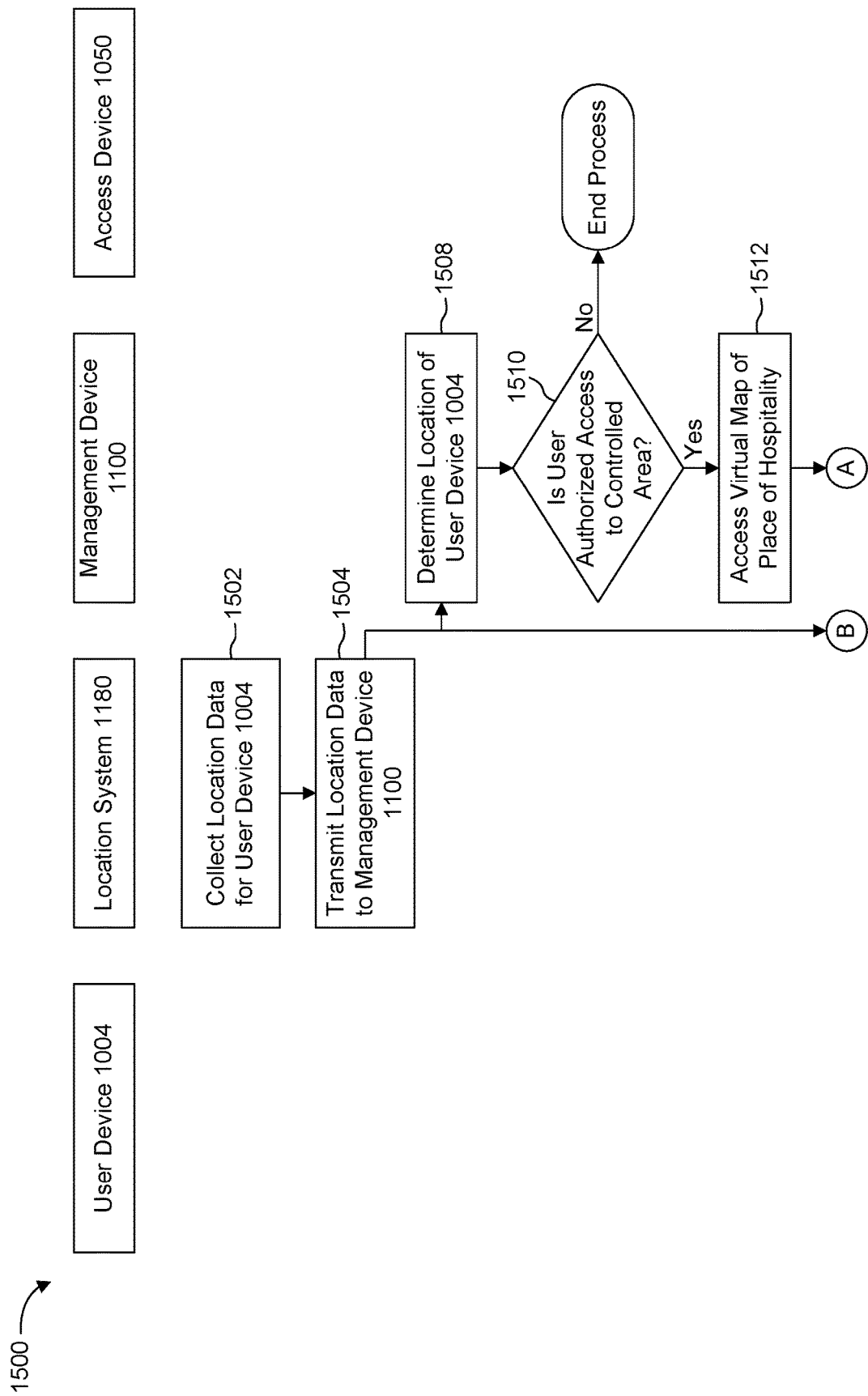
FIGS. 15, 16, 17, and 18 illustrate a flow chart showing an example process for providing access to a controlled area.
Figure 16:
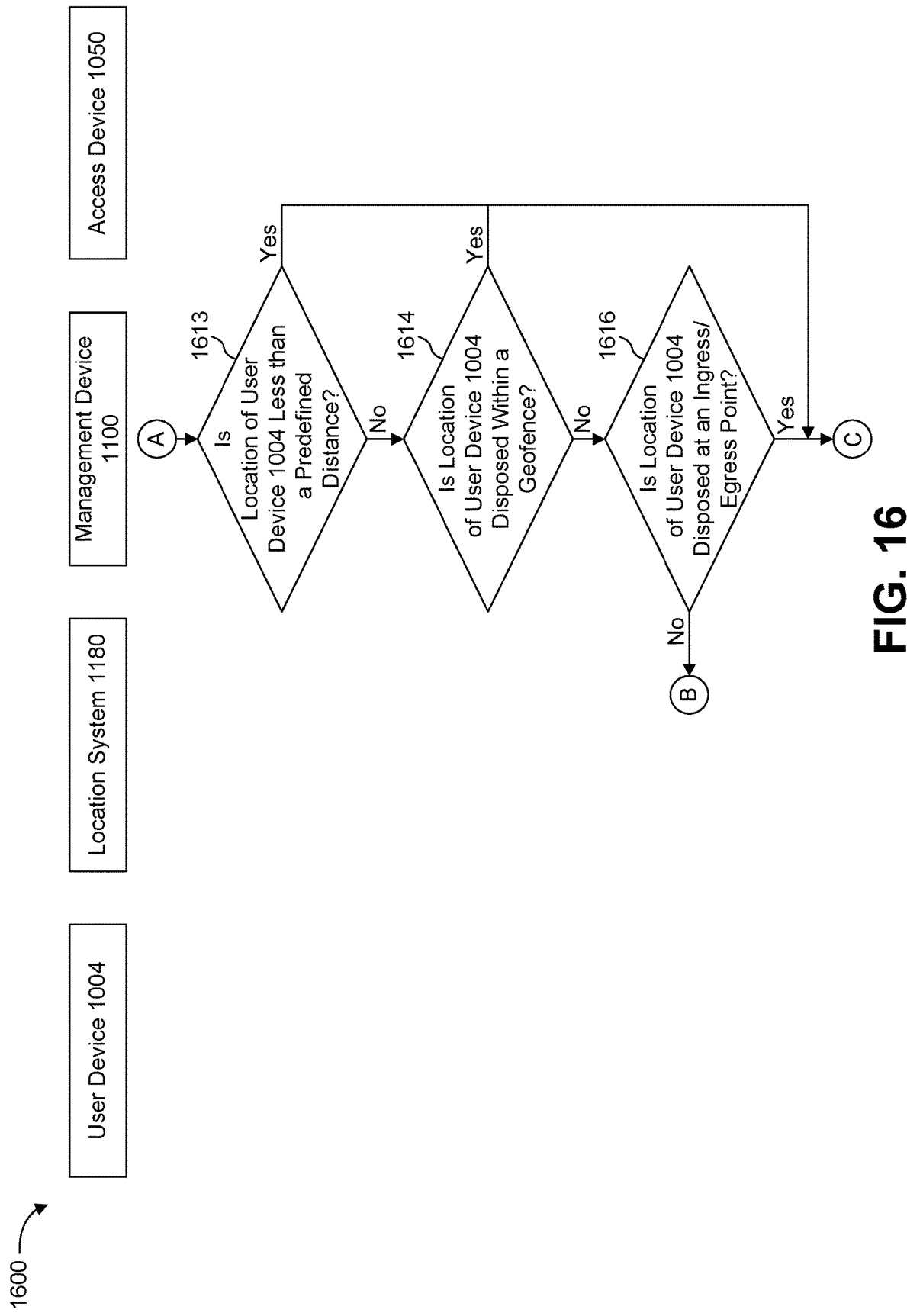
Figure 17:
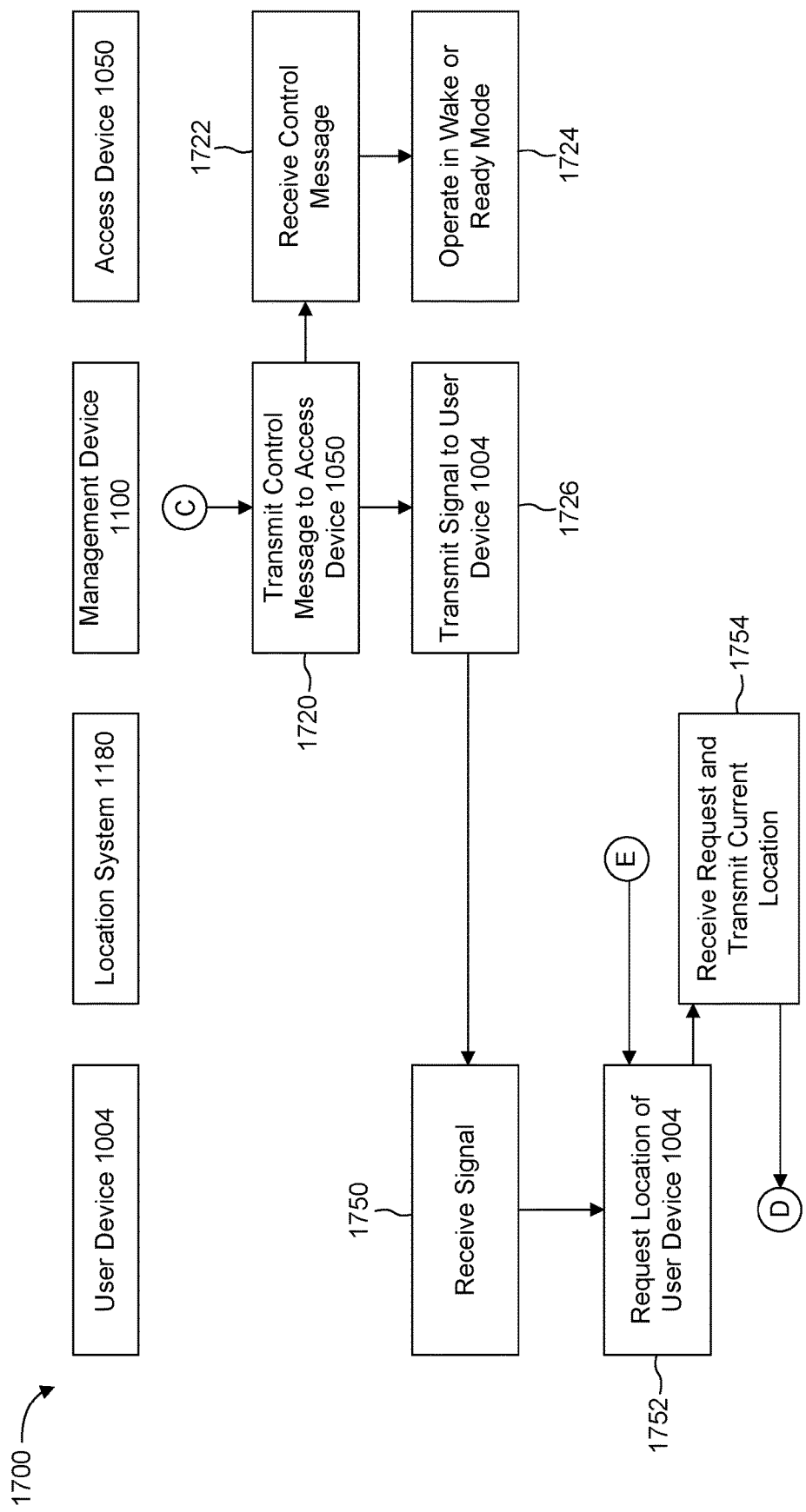
Figure 18:
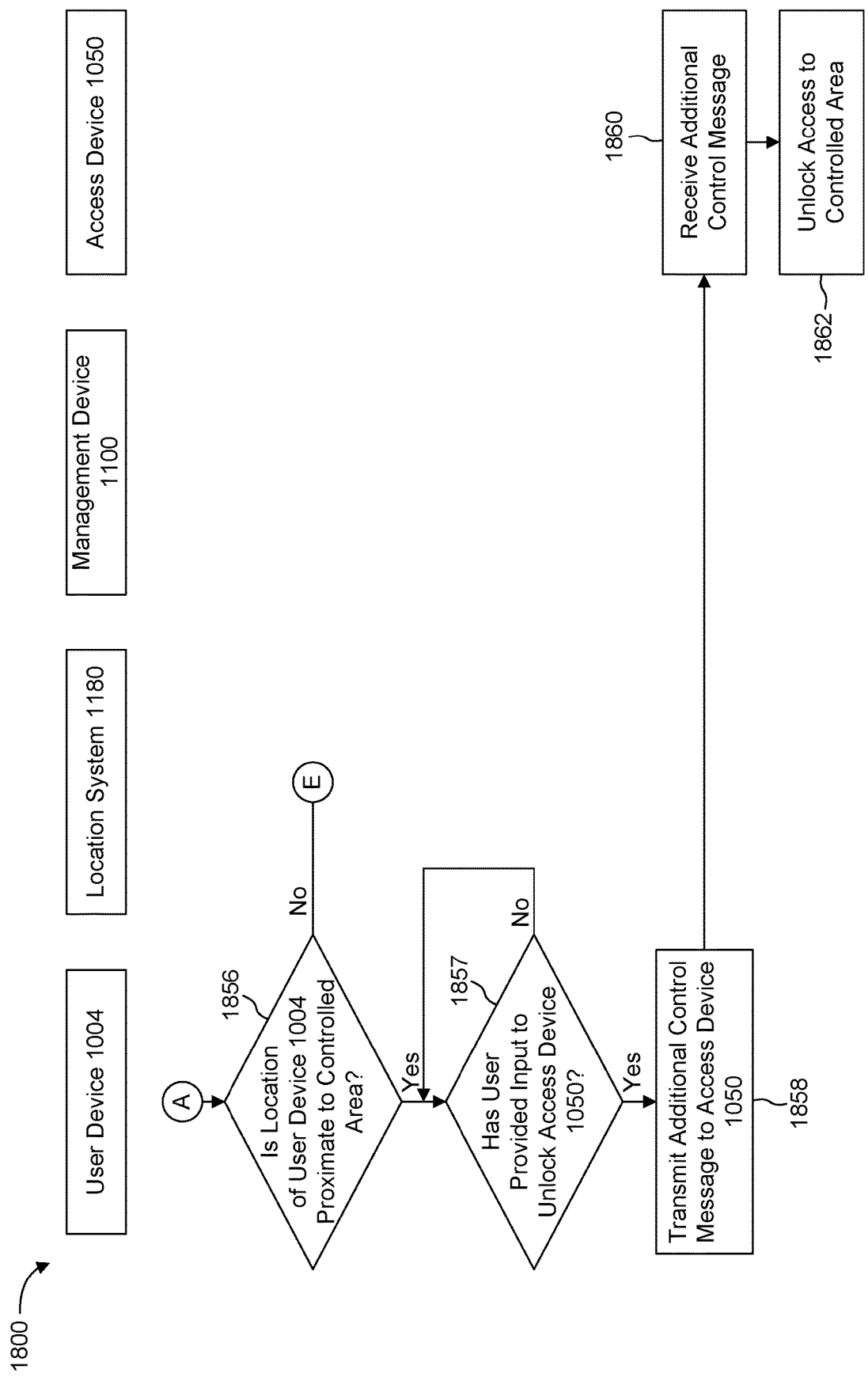

FIG. 14 depicts the example virtual map of the place of hospitality now including a plurality of pivot points P00-P16. The pivot points P00-P16 may represent critical locations within the place of hospitality. In particular, the pivot points P00-P16 may show the positioning of Bluetooth devices or other sensors at ingress, egress, and pivot points in the place of hospitality. Thus, the pivot points P00-P16 may mark particular ingress, egress, and pivot points. As an example, a pivot point P00 may mark an ingress point at the front of the place of hospitality. As another example, a pivot point P14 may mark a pivot point into the public area 1435 (e.g., a hallway). The pivot points P00-P16 may enable accurate positioning of a user and augment a radio map associated with other positioning services.

While select methods of monitoring a location of a user within a place of hospitality are described in reference to FIGS. 12 through 14, one of ordinary skill in the art would appreciate that other methods of determining the location of a user may also be used. In particular, to achieve a high level of accuracy in predicting the location of a user in an indoor space (e.g., a place of hospitality), a hybrid indoor positioning system may be used. The hybrid indoor positioning system may employ a combination of infrastructure services (e.g., Wi-Fi positioning, GPS, CASS, assisted GPS, and cellular triangulation), pivot point radio frequency enabled devices (e.g., near field communication (NFC), Bluetooth, and RFID devices), and mobile phone sensors such as a magnetometer in conjunction with a mobile application and application server to determine a location of a user device. In the hybrid system, an infrastructure service may be used to provide signal strength fingerprint-based positioning. The mobile phone sensor such as a magnetometer may provide dead reckoning (i.e., heading or, more specifically, a prediction of a current position of the device based on an earlier position). And the pivot point radio frequency enabled devices, in conjunction with the infrastructure service and the mobile phone sensors, may partition the indoor space at pivot points to provide an added level of accuracy.

Although each of the different positioning technologies described above may be associated with certain accuracy limitations, the use of these technologies together may provide a robust method of estimating the location of a user. In particular, a hybrid positioning method may be an improvement over single-band sensor approaches as a result of its divide-and-conquer manner.

FIGS. 15A through 15D show an example method for providing access to a controlled area at a place of hospitality is described. For illustration purposes, the method depicted in FIGS. 15A through 15D is described in reference to one or more elements of FIGS. 8 through 14.

In method 1500, a location system 1180 may collect location data of the user device 1004 (step 1502). The location system 1180 may include one or more devices connected to the geospatial network 1010. For example, the location system 1180 may include GPS or GNSS satellites such as the satellite 1012. The location system 1180 may also include Wi-Fi access points that are located at a place of hospitality such as the Wi-Fi hotspot 1016. The GPS or GNSS satellites may collect geospatial data on the user device 1004, and a Wi-Fi sensor located on the user device 1004 may measure the intensity of signals received from the Wi-Fi access points or received signal strengths (RSS).

At step 1504, the location system 1180 may transmit the collected location data to the management system 1100. At step 1508, the management system 1100, via one or more processors 1120 executing location determining module 1172, may determine a location of the user device 1004. The management system 1100 may determine the location of the user device 1004 using, for example, the location data received from the location system 1180. For instance, if the location data included measures of the RSS of a plurality of Wi-Fi access points, then the management system 1100 may use triangulation techniques to pinpoint the location of the user device 1004. When more than one type of location data is collected (e.g., cellular, Wi-Fi, Bluetooth, GPS, GNSS, etc.), the management system 1100 may also determine the location of the user device 1004 by using several different positioning techniques.

In certain aspects, the location system 1180 may determine the location of the user device 1004. The management system 1100 may then determine the location of the user device 1004 by accessing and retrieving the location of the user device 1004 from the location system 1180.

At step 1510, the management system 1100, via one or more processors 1120 executing access rights module 1174, may determine whether a user associated with the user device 1004 has access rights to a controlled area (i.e., is authorized to access a controlled area) at the place of hospitality. Controlled areas at a place of hospitality may include guest rooms, a fitness center, a parking lot, a VIP club, or other areas with restricted access. The management system 1100 may determine the access rights of the user associated with the user device 1004 by accessing information stored on the central reservation system 1040. The central reservation system 1040 may store information regarding reservations made by guests at the place of hospitality. The management system 1100 may determine whether the user has a reservation at the place of hospitality based on the information stored on the central reservation system 1040. For example, the management system 1100 may look up the user in the central reservation system 1040 and find a reservation associated with the user. When the user has a reservation, the management system 1100 may determine whether the reservation grants the user any access rights to controlled areas at the place of hospitality (i.e., whether the reservation authorizes access to any controlled areas at the place of hospitality).

If the management system 1100 determines that the user associated with the user device 1004 has access rights to a controlled area at the place of hospitality (step 1510: YES), then the method may proceed to step 1512. If the management system 1100 determines that the user associated with the user device 1004 does not have access rights to any controlled area at the place of hospitality (step 1510: NO), then the method may terminate.

At step 1512, the management system 1100, via one or more processors 1120 executing proximity determining module 1176, may access a virtual map of the place of hospitality. The virtual map may be stored in the memory 1110 of the management system 1100 or may be stored in a remote device or server that is accessible to the management system 1100. For illustration purposes, the virtual map may be the example virtual maps depicted in FIGS. 5, 6, and 7.

At steps 1513 through 1516, the management system 1100, via one or more processors 1120 executing proximity determining module 1176, may determine when the location of the user device 1004 is within a first area proximate to the controlled area that the user is authorized to access. The management system 1100 may be determining when the user device 1004 is located within a first area proximate to the controlled area in order to know when to transmit a first control message for configuring an access device to operate in a wake mode to the access device for the controlled area. The management system 1100 may want to ensure that the first control message is sent sufficiently in advance of the user's approach to the controlled area so that the user does not experience a delay in gaining access to the controlled area. As depicted in FIG. 1, a delay may arise if the access device for the controlled area is in a sleep mode when the user arrives at the controlled area.

At step 1513, the management system 1100 may determine whether the location of the user device 1004 is less than a predefined distance from the controlled area. The management system 1100 may calculate a distance between the location of the user device 1004 and the controlled area. The distance may be, for example, a straight-line distance between the location of the user device 1004 and the controlled area or a travel distance (i.e., a distance measuring the path of travel) between the location of the user device 1004 and the controlled area. The management system 1100 may then determine when the determined distance is less than a predefined value indicating that the location of the user device 1004 is within the first area proximate to the controlled area.

When the management system 1100 determines that the location of the user device 1004 is less than the predefined distance from the controlled area (step 1513: YES), then the method may proceed onto step 1520. When the management system 1100 determines that the location of the user device 1004 is not less than the predefined distance from the controlled area (step 1513: NO), then the method may proceed to step 1514. In certain aspects, regardless of whether the management system 1100 determines that the location of the user device 1004 is less than the predefined distance from the controlled area, the method may proceed to step 1514. In other aspects, when the management system 1100 determines that the location of the user device 1004 is not less than the predefined distance from the controlled area, the method may proceed back to step 1508, where the management system 1100 may determine a new location for the user device 1004.

At step 1514, the management system 1100 may determine whether the location of the user device 1004 is within a predefined geofence. The predefined geofence may enclose the first area that is proximate to the controlled area. The management system 1100 may use a virtual map of the place of hospitality to determine when the user device 1004 crosses a geofence and is located within the boundaries of the geofence. For example, the management system 1100, referencing the example virtual map in FIG. 6 including the plurality of geofences G00-G08, may determine whether the user device 1004 is located within a particular geofence (e.g., geofence G04).

When the management system 1100 determines that the location of the user device 1004 is located within a predefined geofence (step 1514: YES), then the method may proceed onto step 1520. When the management system 1100 determines that the location of the user device 1004 is not with a predefined geofence (step 1514: NO), then the method may proceed to step 1516. In certain aspects, regardless of whether the management system 1100 determines that the location of the user device 1004 is within a predefined geofence, the method may proceed to step 1516. In other aspects, when the management system 1100 determines that the location of the user device 1004 is not within a predefined geofence, the method may proceed back to step 1508, where the management system 1100 may determine a new location for the user device 1004.

As step 1516, the management system 1100 may determine whether the location of the user device 1004 is disposed at an entrance or ingress/egress (e.g., a pivot point) to the place of hospitality. In particular, the management system 1100, referencing a virtual map of the place of hospitality such as the example virtual map depicted in FIG. 7 including the plurality of pivot points P00-P16, may determine whether the user device 1004 has been detected at a pivot point near the entrance to the place of hospitality. A sensor such as a Bluetooth device may be located at the pivot point. The sensor may be configured to transmit a signal to the management system 1100 via the geospatial network 1010 when the sensor detects the user device 1004. Accordingly, the management system 1100 may determine whether the user device 1004 is located at a particular pivot point by determining whether the sensor located at the pivot point has detected the presence of the user device 1004.

When the management system 1100 determines that the location of the user device 104 is located at a particular pivot point such as an ingress/egress point (step 1516: YES), then the method may proceed onto step 1520. When the management system 1100 determines that the location of the user device 1004 is not located at a particular pivot point (step

1516: NO), then the method may proceed back to step 1508, where the management system 1100 may determine a new location for the user device 1004.

In certain aspects, steps 1513, 1514, and 1516 may be performed concurrently, sequentially, or in a different order. In other aspects, one or more of steps 1513, 1514, or 1516 may be eliminated.

At step 1520, the management system 1100, via one or more processors 1120 executing control message module 1178, may transmit a control message to the access device of the controlled area or, specifically, the access device 1050. This control message may correspond to the "signal configured to cause the access device to operate in a first mode" referred to in the claims. The control message may include instructions that, when executed by the access device 1050, may cause the access device 1050 to operate in a wake mode. In the wake mode, the access device may be configured to receive and respond to additional control messages from the management system 1100. In particular, the access device when operating in the wake mode may be configured to receive and respond an unlock control message (i.e., a message that instructs the access device 1050 to unlock). At step 1526, the management system 1100 may also transmit a signal to the user device 1004. Steps 1520 and 1526 may be performed concurrently, in the order shown, or in a different order.

At step 1522, the access device 1050 may receive the control message. At step 1524, the access device 1050 may operate in a wake or ready mode. Prior to receiving the control message, the access device 1050 may have been operating in a sleep mode. In the sleep mode, the access device 1050 may have had limited functionality. In particular, the access device 1050 operating in the sleep mode may not respond to receiving an unlock control message instructing the access device 1050 to unlock and provide access to the controlled area. The access device 1050 may switch from operating in the sleep mode to operating in the wake mode in response to receiving the control message sent by the management system 1100.

At step 1550, the user device 1004 may receive the signal sent by the management system 1100. The signal may configure the user device 1004 to determine when to transmit an additional control message to the access device 1050. This additional control message may correspond to the "signal configured to cause the access device to provide access to the controlled area." This additional control message may be referring to as an "unlock control message." The unlock control message may include instructions that, when executed by the access device 1050, may cause the access device 1050 to unlock and provide access to the controlled area.

At steps 1552 and 1554, the user device 1004 may communicate with the location system 1180 to determine a current location of the user device 1004. In particular, since the management system 1100 had determined that the location of the user device 1004 is within a first area proximate to the controlled area, the user (carrying the user device 1004) may have moved to a new location. For example, as the user walked through the front entrance of the place of hospitality, he may have set off a sensor that informed the management system 1100 that the user was within the first area proximate to the controlled area. The user may have continued to walk through the place of hospitality while the management system 1100 sent a first control message to the access device 1050 to configure it to operate in a wake mode. Referring to virtual map of the place of hospitality, as depicted in FIG. 14, the user may have walked through the public area 1430 and continued onto the elevator 1410. As the user is travelling through the place of hospitality, the user device 1004 may monitor the movement of the user device 1004 in order to determine when the user device 1004 is in a second area proximate to the controlled area. The user device 1004 may begin monitoring the movement of the user device 1004 after receiving the signal from the management system 1100.

At step 1556, the user device 1004, having determined a current location of the user device 1004 by communicating with location system 1180, may determine whether the current location of the user device 104 is in a second area proximate to the controlled area. The second area proximate to the controlled area may be located closer to the controlled area than the first area proximate to the controlled area. For example, if the controlled area is the room 1460, then the first area proximate to the controlled area may be the area defined by the geofence G04 (see FIG. 14), and the second area proximate to the controlled area may be the area defined by the geofence G06 (see FIG. 14). As another example, if the controlled area is the room 1464, then the first area proximate to the controlled area may be an area including pivot points P00, P02, and P04, and the second area proximate to the controlled area may be pivot point P12 (e.g., when the user first walks off the elevator on the second floor).

If the user device 1004 determines that the current location of the user is within the second area proximate to the controlled area (step 1556: YES), then the method may proceed to step 1557. If the user device 1004 determines that the current location of the user is not within the second area proximate to the controlled area (step 1556: NO), then the method may proceed back to step 1552, where the user device 1004 again communicates with the location system 1180 to determine a current location of the user device 1004. The user device 1004 may continue to monitor the movement of the user device 1004 through the place of hospitality by communicating with the location system 1180 indefinitely or until a certain condition is met. For example, the user device 1004 may continue to monitor its movement until a certain amount of time has passed, it determines that it is no longer located at the place of hospitality, it has received an instruction from the user or another external source to cease monitoring, etc.

At step 1557, the user device 1004 may wait on an input from the user to unlock the access device 1050. Specifically, the user device 1004 may determine whether the user has provided an input to unlock the access device 1050. When the user provides the input to unlock the access device 1050 (step 1557: YES), the method may proceed to step 1558. When the user does not provide the input to unlock the access device 1050 (step 1557: NO), the method may repeat step 1557. In certain aspects, after checking for an input from the user for a predefined period of time, the method may terminate.

At step 1558, the user device 1004 may transmit the additional control message to the access device 1050. In certain aspects, transmitting the additional control message may involve transmitting a signal to another device (e.g., a lock server or the management system 1100) that in response transmits the additional control message to the access device 1050. The additional control message may contain instructions that, when executed by the access device 1050, may cause the access device 1050 to unlock and provide access to the controlled area.

In some aspects, step 1557 may also be eliminated. As a result, when the user device 1004 determines that the current location of the user is within the second area proximate to the controlled area (step 1556: YES), the method may continue to step 1558, where the additional control message is transmitted to the access device 1050. When the additional control message is an unlock control message (e.g., a control message including an unlock event), the elimination of step 1557 may provide for the automatic unlocking of the access device 1050.

In particular aspects, steps 452 through 458 may be performed by the management system 200 instead of the user device 104. In such aspects, the steps 426 and 450 may be eliminated.

At step 1560, the access device 1050 may receive the additional control message. And at step 1562, the access device 1050 may unlock access to the controlled area. The access device 1050 may unlock access to the controlled area, for example, in response to receiving the additional control message.

Figure 19:
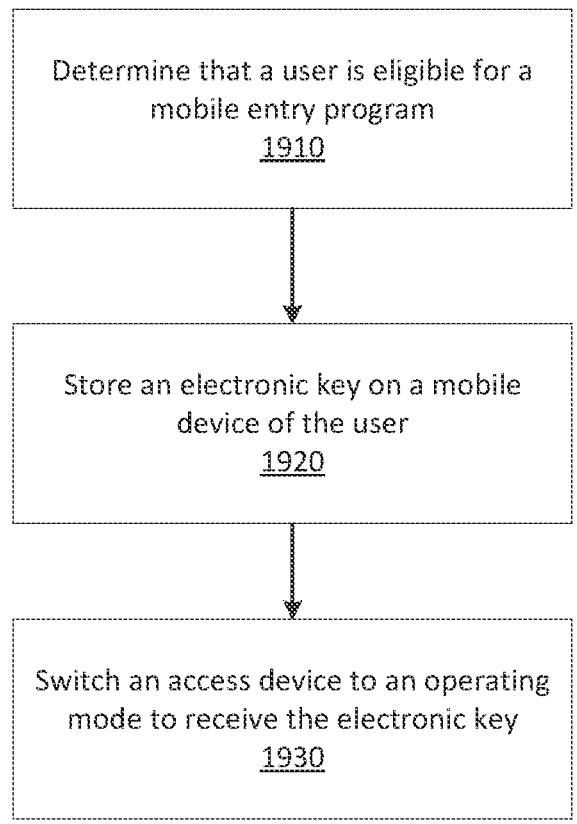
FIG. 19 illustrates a flow chart showing an example process for mobile entry.

FIG. 19 shows an example method. At step 1910, it may be determined that a user is eligible for a mobile entry program. The user may be a user of a mobile device (e.g., user device 101 in FIG. 1, user device 1040 in FIG. 10, FIG. 15, FIG. 16, FIG. 17, and FIG. 18). A computing device (e.g., computing device 103 in FIG. 1, management system 1100, central reservation system 1040, other device(s) 1070 in FIG. 10, location system 1180, management system 1100 in FIG. 15, FIG. 16, FIG. 17, FIG. 18) may determine that the user is eligible for the mobile entry program. The mobile entry program may be a program in which a guest may receive an electronic key associated with a hospitality service, such as on a mobile device.

Determining that the user is eligible for the mobile entry program may include determining that the user has a reservation for a hospitality service. Determining that the user has the reservation may include determining an identity of the user. The identity of the user may be determined based the mobile device. For example, a database of devices may store information about users and mobile devices associated with the users. The identity of the user may be determined based on information input via the mobile device, such as log in information. The log in information may include a username, an account number, contact information, and/or a password. Determining that the user has the reservation may include querying a database of reservations.

Determining that the user is eligible for the mobile entry program may be based on a parameter of the reservation. For example, the user may be eligible for the mobile entry program if the time or date is within a predetermined timeframe of a time or date of the reservation. Determining that the user is eligible for the mobile entry program may be based on a status of the reservation, such as a ready status or a checked-in status.

Determining that the user is eligible for the mobile entry program may be based on a capability or setting of the mobile device, such as a data setting, a security setting, or available memory of the mobile device. Determining that the user is eligible for the mobile entry program may be based on an application being installed on the mobile device. The method may further comprising causing a user interface of the application to display via the mobile device. Determining that the user is eligible for the mobile entry program may be based on the user opting-in for the mobile entry program, such as via the application (e.g., 208 in FIG. 2).

At step 1920, an electronic key may be stored on the mobile device. The electronic key may be associated with the mobile entry program. The electronic key may be configured to enable access to the hospitality service or a controlled area. Access to the hospitality service or the controlled area may be controlled by an access device. The electronic key may be stored to the access device. The electronic key may be stored to a plurality of access devices, such as access devices at a plurality of hospitality services, controlled areas, or places of hospitality. The access device may allow access to the hospitality service or the controlled area based on receipt of the electronic key.

The method may include generating the electronic key. The electronic key may be generated based on the determining that the user is eligible for the mobile entry program. The electronic key may be generated based on the user making the reservation. The electronic key may be generated based on the user opting into the mobile entry program. The electronic key may be generated based on a check-in associated with the reservation. The electronic key may be stored at a database of electronic keys.

Storing the electronic key to the mobile device may include transmitting the electronic key to the mobile device. The electronic key may be stored on internal or external memory of the mobile device. The electronic key may be stored on a portion of memory of the mobile device storing an application (e.g., application 200 in FIG. 2, application 400 in FIG. 4). The electronic key may be stored by the computing device.

Storing the electronic key to the mobile device may be based on the determining that the user is eligible for the mobile entry program. Storing the electronic key to the mobile device may be based on the reservation. The method may include sending credentials to the user, such as to an email account or a device associated with the reservation. The user may enter the credentials, such as via a web page or via the application on the mobile device. Based on the entered credential matching the credentials sent to the user, the electronic key may be stored to the mobile device.

At step 1930, the access device may be switched to an operating mode. The operating mode may be a mode in which the access device can receive the key, such as a wake mode or a non-power saving mode. The access device may be switched from a sleep mode to the wake mode. The access device may be switched from a power saving mode to the non-power saving mode. The access device may be switched to the operating mode by the computing device. The access device may be switched the operating mode by the mobile device.

Switching the access device to the operating mode may include transmitting a signal to the access device. The signal may include an indication to operate in the operating mode. The signal may be transmitted based on a location of the mobile device. For example, the signal may be transmitted to the access device based on a determination that the mobile device is within a predetermined distance (e.g., five feet, ten feet, twenty feet, a half mile, a mile, two miles, etc.) relative to the access device 108. The signal may be transmitted based on a user selection input via the mobile device (e.g., via the application). For example, the signal may be transmitted based on the user selecting an icon on a graphic user interface of the application indicating access to the hospitality service or the controlled area.

Figure 20:
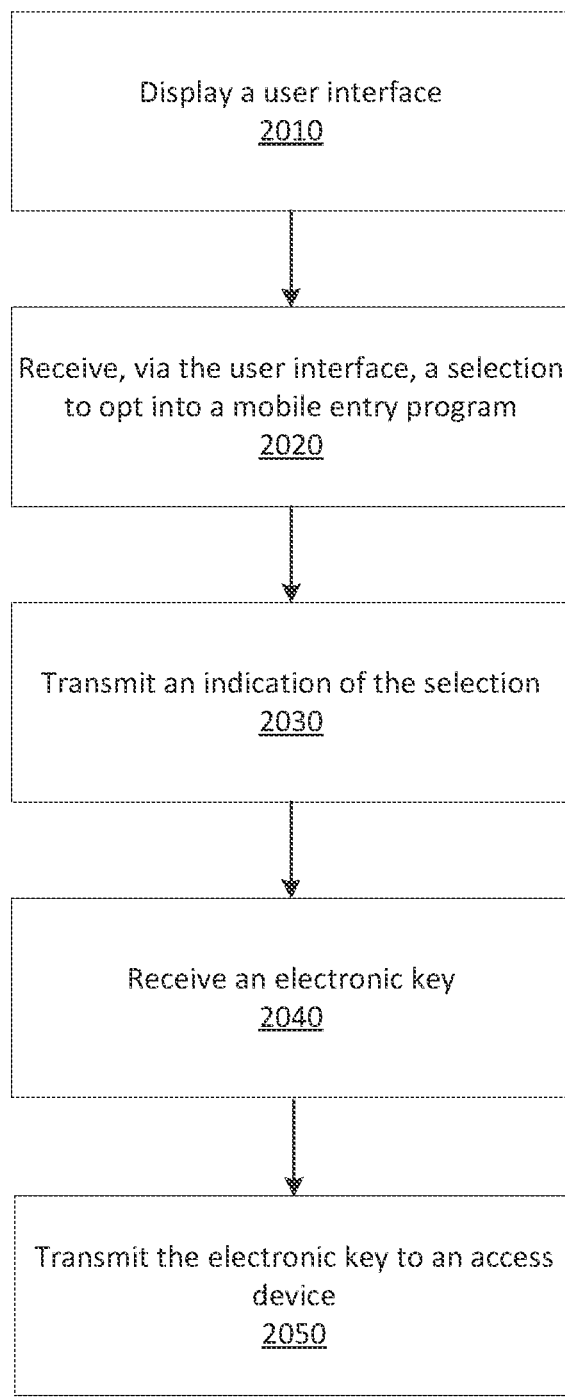
FIG. 20 illustrates a flow chart showing an example process for mobile entry.

FIG. 20 shows an example method. At step 2010, a user interface (e.g., user interface in FIG. 2, FIG. 4) may be displayed. The user interface may be displayed via a mobile device (e.g., user device 101 in FIG. 1, user device 1040 in FIG. 10, FIG. 15, FIG. 16, FIG. 17, FIG. 18). The user interface may be displayed on an application (e.g., application 200 in FIG. 2, application 400 in FIG. 4) on the mobile device. The user interface may be displayed based on a log-in via the application, such as a log-in to an account associated with a hospitality service or a hospitality reservation system. The user interface may be associated with a mobile entry program. The mobile entry program may be a program in which a guest may receive an electronic key associated with a hospitality service, such as on a mobile device.

At step 2020, a selection to opt into the mobile entry program may be received. The selection may be received via the user interface. The selection may be received by the mobile device. The selection may include a selection of an icon. The selection may include a user input via the user interface.

At step 2030, an indication of the selection may be sent. The indication of the selection may be sent to a computing device (e.g., computing device 103 in FIG. 1, management system 200, central reservation system 140, other device(s) 170 in FIG. 10, location system 1180, management system 1100 in FIG. 15, FIG. 16, FIG. 17, FIG. 18). The computing device may be associated with the mobile entry program, the hospitality service, or a place of hospitality.

At step 2040, an electronic key may be received. The electronic key may be received by the mobile device. The electronic key may be received from the computing device. The electronic key may be received in response to the sending the selection to opt into the mobile entry program.

The electronic key may be associated with the mobile entry program. The electronic key may be configured to enable access to the hospitality service or a controlled area. Access to the hospitality service or the controlled area may be controlled by an access device. The electronic key may be stored to the mobile device.

At step 2050, the electronic key may be transmitted to the access device. The electronic key may be transmitted to the access device by the mobile device. The electronic key may be transmitted to the access device based on the mobile device being within a threshold distance of the access device. The electronic key may be transmitted to the access device when the access device being switched to an operating mode in which the access device is configured to receive the electronic key. The operating mode may be a wake mode or a non-power saving mode. The access device may be switched to the operating mode by the computing device. The access device may be switched to the operating mode by the mobile device.

The electronic key may be transmitted to a plurality of access devices. For example, the electronic key may be transmitted to a first access device associated with a first hospitality service. The electronic key may be transmitted to a second access device associated with a second hospitality service different than the first hospitality service. The electronic key may be transmitted to a plurality of access device configured to control access to a hospitality service. The electronic key may be transmitted to access devices located at various places of hospitality.

The method may include displaying, via the mobile device, an indication of the access device. The indication of the access device may be displayed via the application. The indication of the access device may be a graphic representation of the access device. The indication of the access device may represent a status of the access device, such as the operating mode of the access device. The indication of the access device may represent a location of the mobile device, such as at the place of hospitality. The indication of the access device may represent a distance from the mobile device to the access device. The indication of the access device may be selectable or may be configured to enable a selection to transmit the electronic key to the access device. The electronic key may be transmitted to the access device based on a selection, via the application, to transmit the electronic key.

Access to the hospitality service may be granted. For example, the access device may grant access based on the transmitted electronic key being associated with the reservation. The access device may grant access based on the transmitted electronic key matching a key saved to the access device or in a database of keys. The hospitality service may be accessed.

Aspects of the disclosure may include communication channels that may be any type of wired or wireless electronic communications network, such as, e.g., a wired/wireless LAN, a wired/wireless PAN, a wired/wireless HAN, a wired/wireless WAN, a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wi-Fi, Bluetooth, and/or the like, and/or a combination of two or more thereof.

Aspects of the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. For example, the user device 104 may be a mobile smartphone operated by an advanced mobile data processing and communication operating system.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that is specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a CPU, and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

It should also be appreciated that the elements and systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, tablets, cellphones, wireless phones, pagers, electronic organizers. Internet appliances, and various other consumer products that include appropriate communication capabilities. In addition, the functionality provided by the illustrated elements may in some aspects be combined in fewer elements or distributed in additional elements. Similarly, in some aspects, the functionality of some of the illustrated elements may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

It will be appreciated that the present disclosure may include any one and up to all of the following examples.

Example 1: A method for managing access devices at a place of hospitality, comprising: determining a first location of a device of a user; determining that the user is authorized access to a controlled area; determining when the first location of the device of the user is within a first area proximate to the controlled area; and transmitting a first signal to an access device associated with the controlled area when the first location of the device of the user is within the first area proximate to the controlled area, the first signal used to manage an operation of the access device.

Example 2: The method of Example 1, wherein the access device is an electronic radio-frequency identification lock system.

Example 3: The method of Example 1, wherein the first location of the device of the user is determined based on at least one of: Global Positioning System data, cell tower data, Wi-Fi positioning data, Bluetooth positioning data, image data, and infrared sensor data.

Example 4: The method of Example 1, wherein the access device is configured to operate in a first mode in response to receiving the first signal.

Example 5: The method of Example 4, wherein the access device operating in the first mode is configured to provide access to the controlled area in a shorter period of time than the access device operating in a second mode.

Example 6: The method of Example 4, wherein the access device operating in the first mode uses a greater amount of energy than the access device operating in a second mode.

Example 7: The method of Example 4, wherein the access device operating in the first mode uses a greater amount of energy than the access device operating in a second mode.

Example 8: The method of Example 1, wherein the controlled area is a guest room at the place of hospitality.

Example 9: The method of Example 1, wherein determining that the user is authorized access to a controlled area at the place of hospitality comprises: accessing reservation information for the place of hospitality; determining that the user has a reservation at the place of hospitality; and determining a controlled area at the place of hospitality to which the reservation authorizes access.

Example 10: The method of Example 1, wherein determining when the first location of the device of the user is within the first area proximate to the controlled area comprises: determining a distance between the first location of the device of the user and the controlled area; and determining when the distance is less than a predefined value, the predefined value associated with the first area proximate to the controlled area.

Example 11: The method of Example 1, wherein determining when the first location of the device of the user is within the first area proximate to the controlled area comprises: accessing a virtual map of the place of hospitality, the virtual map comprising one or more geofences defining a boundary of the first area proximate to the controlled area; and determining when the first location of the device of the user is disposed within the one or more geofences.

Example 12: The method of Example 1, wherein determining when the first location of the device of the user is within the first area proximate to the controlled area comprises: receiving a second signal from a sensor located at a critical point in the place of hospitality, the sensor configured to transmit the second signal when the sensor detects the device of the user.

Example 13: The method of Example 12, wherein the critical point is at least one of: an ingress point, an egress point, and a pivot point.

Example 14: The method of Example 1, further comprising: determining a second location of the device of the user; determining when the second location of the device of the user is within a second area proximate to the controlled area; and transmitting a third signal to the access device associated with the controlled area when the second location of the device of the user is within the second area proximate to the controlled area, the third signal used to enable access to the controlled area.

Example 15: The method of Example 14, wherein at least a portion of the second area is disposed more proximate to the controlled area than the first area.

Example 16: A device for providing access to a controlled area at a place of hospitality, comprising: a processor; and a memory storing instructions. The instructions, when executed, cause the processor to: determine a location of a device of a user, wherein the user is authorized access to the controlled area; determine a location of a device of a user, wherein the user is authorized access to the controlled area; transmit a first signal to an access device associated with the controlled area when the location of the device is within the area proximate to the controlled area, the first signal used to enable access to the controlled area.

Example 17: The device of Example 16, device is at least one of: a tablet computer, and a mobile phone.

Example 18: The device of Example 16, wherein the location of the device of the user is determined based on at least one of: Global Positioning System data, cell tower data, Wi-Fi positioning data, Bluetooth positioning data, image data, and infrared sensor data.

Example 19: The device of Example 16, further comprising a receiver configured to receive an input from the user, wherein the instructions, when executed, cause the processor to transmit the first signal to the access device when the location of the device is within the area proximate to the controlled area and when the input from the user is received.

Example 20: The device of Example 16, wherein the memory further stores a code for accessing the controlled area, wherein the memory further stores a code for accessing the controlled area.

Example 21: A system for providing access to a controlled area at a place of hospitality, comprising: an access device configured to provide access to the controlled area; and an access device management system comprising a processor, the access device management system configured to: determine, using the processor, a first location of a user device of a user; determine, using the processor, that the user is authorized access to the controlled area; determine, using the processor, when the first location of the user device is within a first area proximate to the controlled area; and transmit a first signal to the access device when the first location of the user device is within the first area proximate to the controlled area, the first signal used to manage an operation of the access device, where the user device configured to transmit a second signal to the access device when a second location of the user device is within a second area proximate to the controlled area, the second signal used to enable access to the controlled area.

Example 22: The system of Example 21, wherein the first location of the user device is determined based on at least one of: Global Positioning System data, cell tower data, Wi-Fi positioning data, Bluetooth positioning data, image data, and infrared sensor data.

Example 23: The system of Example 21, wherein the access device is configured to operate in a first mode in response to receiving the first signal.

Example 24: The system of Example 23, wherein the access device operating in the first mode is configured to provide access to the controlled area in a shorter period of time than the access device operating in a second mode.

Example 25: The system of Example 23, wherein the access device operating in the first mode uses a greater amount of energy than the access device operating in a second mode.

Example 26: The system of Example 21, wherein the access device management system is further configured to: determine the second location of the user device; determine when the second location of the user device is within the second area proximate to the controlled area; and transmit a third signal to the user device when the second location of the user device is within the second area proximate to the controlled area, wherein the user device is configured to transmit the second signal to the access device in response to receiving the third signal.

Example 27: The system of Example 21, wherein the user device is further configured to: determine the second location of the user device; and determine when the second location of the user device is within the second area proximate to the controlled area.

Example 28: The system of Example 21, wherein the controlled area is a guest room at the place of hospitality.

Example 29: The system of Example 21, wherein determining when the first location of the user device is within the first area proximate to the controlled area comprises: determining a distance between the first location of the user device and the controlled area; and determining when the distance is less than a predefined value, the predefined value associated with the first area proximate to the controlled area.

Example 30: The system of Example 21, wherein determining when the first location of the user device is within the first area proximate to the controlled area comprises: accessing a virtual map of the place of hospitality, the virtual map comprising one or more geofences defining a boundary of the first area proximate to the controlled area; and determining when the first location of the user device is disposed within the one or more geofences.

Example 31: The system of Example 21, wherein determining when the first location of the user device is within the first area proximate to the controlled area comprises: receiving a second signal from a sensor located at a critical point in the place of hospitality, the sensor configured to transmit the second signal when the sensor detects the user device.

Example 32: The system of Example 31, wherein the critical point is at least one of: an ingress point, an egress point, and a pivot point.

Example 33: The system of Example 21, wherein at least a portion of the second area is disposed more proximate to the controlled area than the first area.

Example 34: The system of Example 21, wherein the user device is at least one of: a tablet computer, and a mobile phone.

Example 35: The system of Example 21, wherein the user device is further configured to receive an input from the user, wherein the user device is configured to transmit the second signal to the access device when the second location of the user device is within the second area proximate to the controlled area and when the input from the user is received.

Example 36: A method for managing access devices at a place of hospitality, comprising: determining a first location of a device of a user; determining that the user is authorized access to a controlled area; determining that the first location of the device of the user is within a first area proximate to the controlled area; and transmitting, based on the determination that the first location of the user device is within the first area proximate to the controlled area, a first signal to an access device associated with the controlled area, wherein the first signal causes the access device to operate in a first power mode.

Example 37: The method of example 36, wherein the access device comprises an electronic radio-frequency identification lock system.

Example 38: The method of example 36, wherein the first location of the device of the user is determined based on at least one of: Global Positioning System data, cell tower data, Wi-Fi positioning data, Bluetooth positioning data, image data, and infrared sensor data.

Example 39: The method of example 36, wherein the first mode enables the access device to receive a second signal, wherein the second signal causes the access device to allow access to the controlled area.

Example 40: The method of example 39, wherein the access device is further configured to operate in a second mode, and wherein the access device, operating in the first mode, is configured to provide access to the controlled area in a shorter period of time than the access device operating in the second mode.

Example 41: The method of example 39, wherein the access device is further configured to operate in a second mode, and wherein the access device, operating in the first mode, uses a greater amount of energy than the access device operating in the second mode.

Example 42: The method of example 39, wherein the access device operating in the first mode is configured to access a code for accessing the controlled area stored in the device of the user.

Example 43: The method of example 36, wherein determining that the user is authorized access to the controlled area at the place of hospitality comprises: accessing reservation information for the place of hospitality; determining, based on the reservation information, that the user has a reservation at the place of hospitality; and determining a controlled area at the place of hospitality to which the reservation of the user authorizes access.

Example 44: The method of example 36, wherein determining that the first location of the device of the user is within the first area proximate to the controlled area comprises: determining a distance between the first location of the device of the user and the controlled area; and determining that the distance is less than a predefined value, wherein the predefined value is associated with the first area proximate to the controlled area.

Example 45: The method of example 36, wherein determining that the first location of the device of the user is within the first area proximate to the controlled area comprises: accessing a virtual map of the place of hospitality, the virtual map comprising one or more geofences defining a boundary of the first area proximate to the controlled area; and determining that the first location of the device of the user is within the one or more geofences.

Example 46: The method of example 36, wherein determining that the first location of the device of the user is within the first area proximate to the controlled area comprises: receiving a second signal from a sensor located at a critical point in the place of hospitality, the sensor configured to transmit the second signal based on a detection of the device of the user.

Example 47: The method of example 46, wherein the critical point comprises at least one of: an ingress point, an egress point, and a pivot point.

Example 48: The method of example 36, further comprising: determining a second location of the device of the user; determining that the second location of the device of the user is within a second area proximate to the controlled area; and transmitting, based on the determination that the second location of the device of the user is within the second area, a third signal to the access device associated with the controlled area, wherein the third signal causes the access device to enable access to the controlled area.

Example 49: The method of example 48, wherein at least a portion of the second area is more proximate to the controlled area than the first area.

Example 50: A device for providing access to a controlled area at a place of hospitality, comprising: a processor; and a memory storing instructions that, when executed, cause the processor to: determine a location of a device of a user, wherein the user is authorized access to the controlled area; determine that the location of the device of the user is within a predetermined distance from the controlled area; and transmit, based on the determination that the location of the device of the user is within the predetermined distance from the controlled area, a first signal to an access device associated with the controlled area, wherein the first signal causes the access device to operate in a power mode.

Example 51: The device of example 50, wherein the device comprises at least one of: a tablet computer, and a mobile phone.

Example 52: The device of example 50, further comprising a receiver configured to receive an input from the user, and wherein the instructions, when executed, cause the processor to transmit the first signal to the access device further based on receiving the input from the user.

Example 53: The device of example 50, wherein the memory further stores a code for accessing the controlled area, wherein the first signal comprises the code for accessing the controlled area.

Example 54: A system for providing access to a controlled area at a place of hospitality, comprising: an access device configured to control access to the controlled area based on a determination that a user device is located within a first distance from the controlled area, wherein the determination is based on a first signal received from the user device; an access management device in communication with the access device, wherein the access management device is configured to: determine a location of the user device; determine that a user associated with the user device is authorized access to the controlled area; determine that the location of the user device is located within a second distance from the controlled area; and transmit, based on the determination that the location of the user device is within the second distance from the controlled area, a second signal to the access device, wherein the second signal causes the access device to operate in a power mode.

Example 55: The system of example 54, wherein the power mode enables the access device to receive the first signal.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed example aspects. The exemplary systems and components described herein may be configured differently than described. For example, elements may be added to, removed from, or rearranged compared to the disclosed example aspects.

The invention claimed is:

1. A method comprising:
determining, via a controller device, a user of a mobile device is eligible for a mobile entry program associated with a hospitality service;
transmitting, to the mobile device, a mobile entry program key associated with a reservation of the user for the hospitality service;
sending, via the controller device, a first control message to an access device located at an access point of the hospitality service to switch from a first operating mode to a second operating mode based on a first location of the mobile device; and sending, via the controller device, a second control message to the access device in the second operating mode based on a second location of the mobile device.

2. The method of claim 1, further comprising:
causing output of a mobile entry program user interface via a display of the mobile device,
wherein the transmitting step is based on receiving, via the mobile entry program user interface, a selection to opt into the mobile entry program.

3. The method of claim 1, further comprising:
receiving a selection to opt in to the mobile entry program from the mobile device; and
generating, based on the receiving step, the mobile entry program key.

4. The method of claim 1, further comprising:
transmitting credentials to an account associated with the user,
wherein the transmitting step is based on the credentials from the mobile device.

5. The method of claim 1, further comprising:
storing the mobile entry program key associated with the reservation on a plurality of access devices located at access points of a plurality of hospitality services.

6. The method of claim 1, further comprising:
generating the mobile entry program key based on a check-in associated with the reservation.

7. The method of claim 6, wherein the generating step is further based on a ready status of the hospitality service.

8. A system comprising:
an access device located at an access point to a hospitality service; and
a controller device configured to:
detect a user of a mobile device is eligible for a mobile entry program and the mobile device is in a first location;
send a first control message to the access device to switch from a first operating mode to a second operating mode based on the detected first location of the mobile device;
detect the mobile device is in a second location; and
send a second control message to the access device in the second operating mode based on the detected second location of the mobile device.

9. The system of claim 8, wherein the access device is configured to receive, in the second operating mode an unlock event associated with the access point.

10. The system of claim 8, wherein the access device is configured to use more power in the second operating mode than in the first operating mode.

11. The system of claim 8, wherein the detected first or second location of the mobile device is proximate to a controlled area of the hospitality service.

12. The system of claim 8, wherein the access device is a lock.

13. The system of claim 12, wherein the access point is a door configured to allow access to the hospitality service.

14. The system of claim 12, wherein the access device queries a database of keys associated with guests authorized to access the hospitality services.

15. A method comprising:
displaying, by a mobile device, a mobile entry program user interface;
receiving, via the mobile entry program user interface, a selection to opt into a mobile entry program associated with a reservation for a hospitality service;
transmitting, based on the selection, an indication of the selection to a controller device;
receiving, in response to the indication of the selection, a mobile entry program key; and
obtaining access to the hospitality service via an access device at an access point of the hospitality service, wherein the obtained access is based on the access device receiving a first control message from a controller device to operate in a wake mode when the mobile device is in a first location, and receiving a second control message to provide the access when the mobile device is in a second location.

16. The method of claim 15, wherein the the second control message includes an unlock event associated with the access point.

17. The method of claim 15, further comprising:
transmitting the mobile entry program key to another access device at an access point of another hospitality service associated with the reservation.

18. The method of claim 15, wherein the obtaining step is based on the mobile device being within a threshold proximity to of the access device.

19. The method of claim 15, wherein
the mobile entry program user interface comprises an interface of a mobile application, and
the displaying step is based on logging into an account on the mobile application via the mobile device.

20. The method of claim 15, further comprising:
displaying, via the mobile entry program user interface, an indication of the access device; and
receiving, via the mobile entry program user interface, a prompt to authorize the access device to communicate with the mobile device.

* * * * *